July 30, 1963     O. J. VAN LEER ET AL     3,099,311
PROCEDURE AND APPARATUS FOR MAKING DRUMS AND THE LIKE
Filed Nov. 2, 1959     14 Sheets-Sheet 2
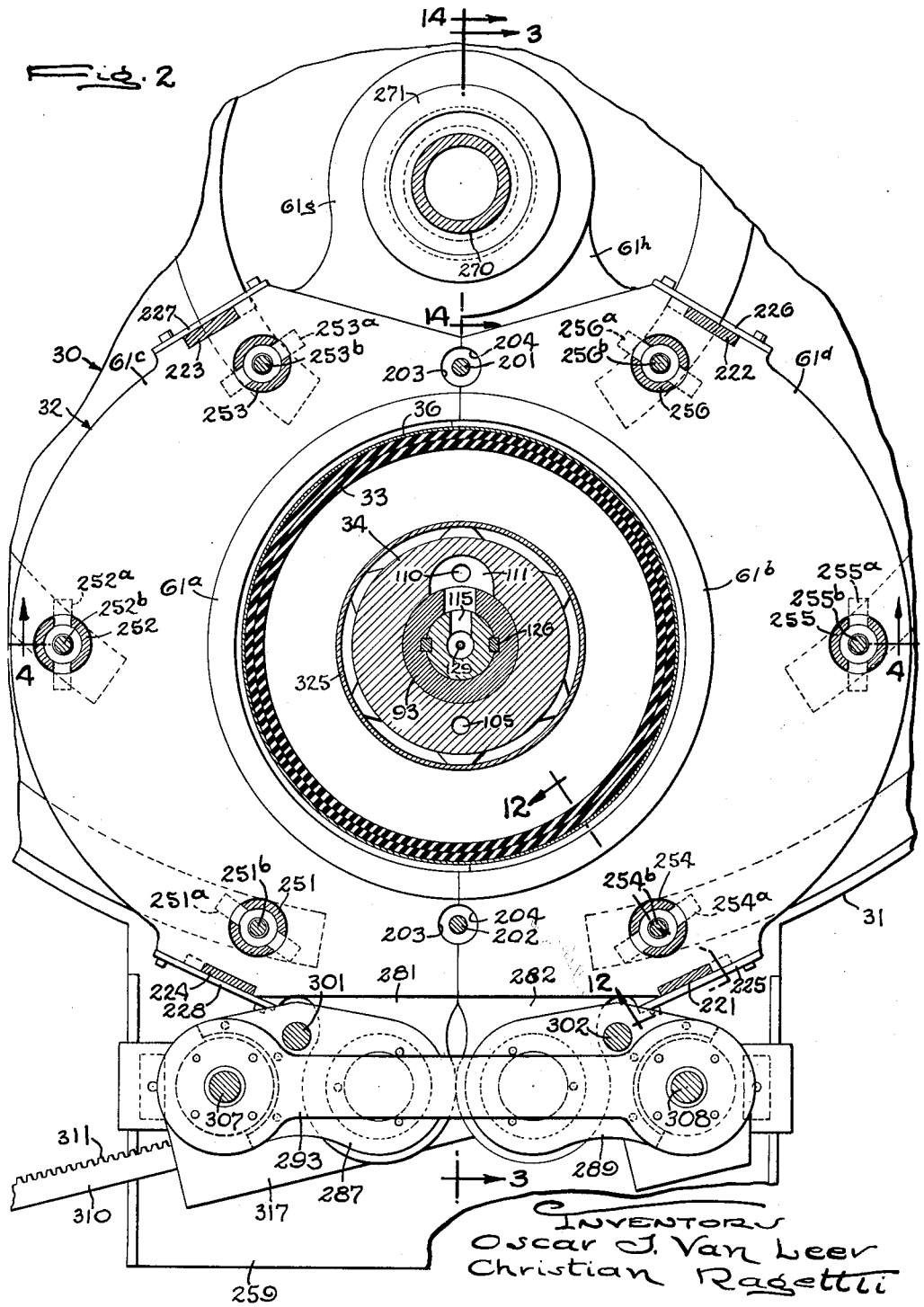

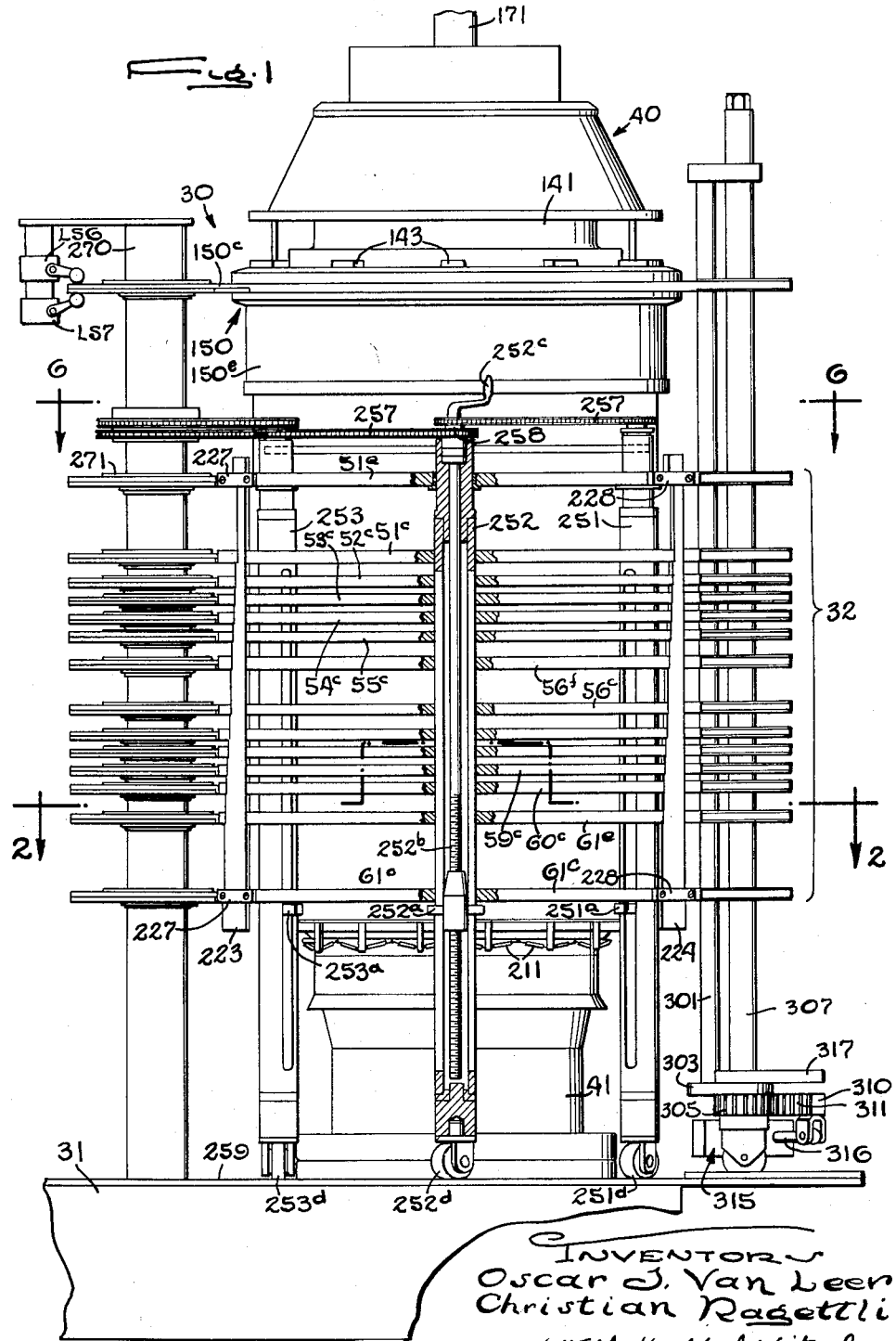

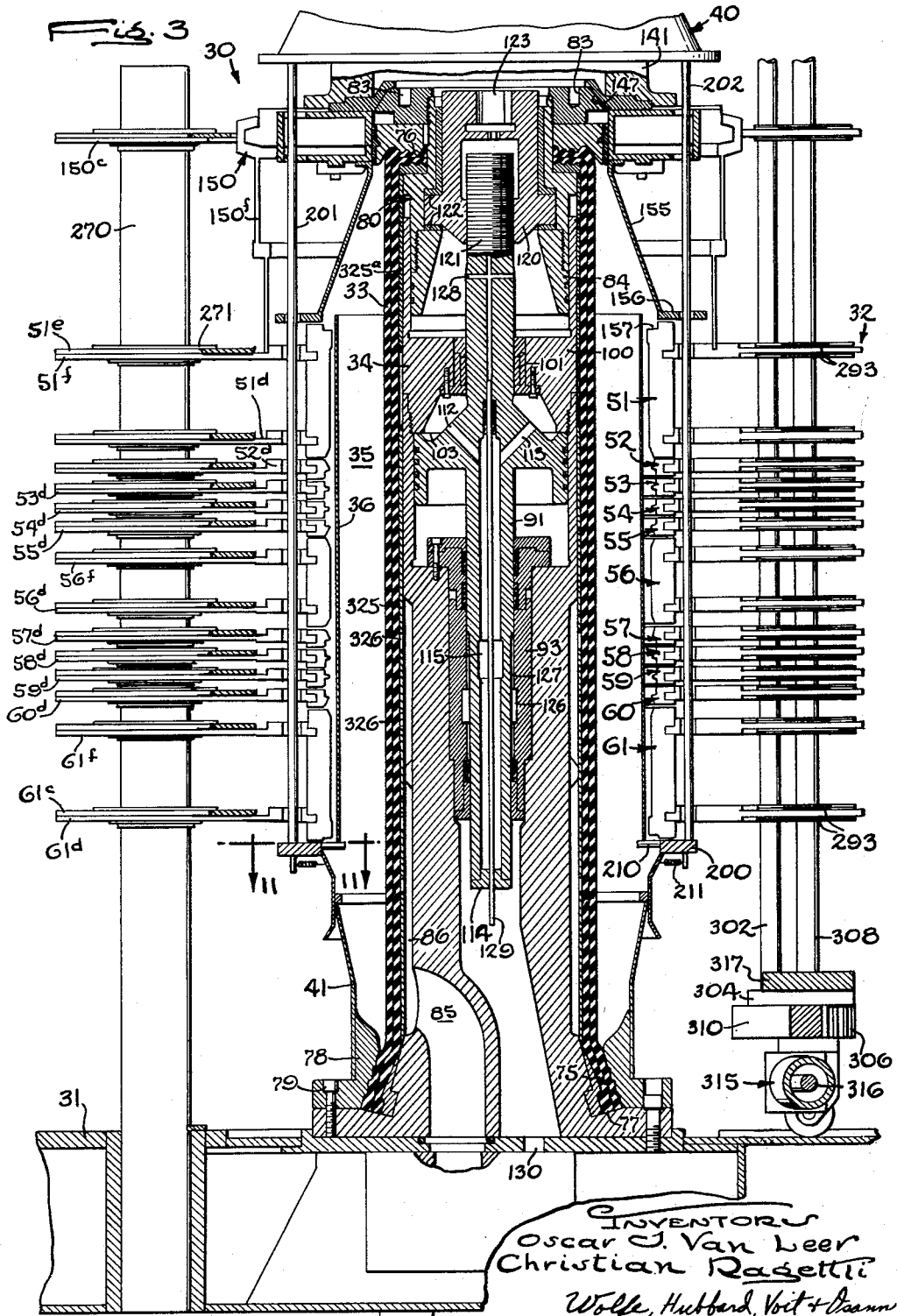

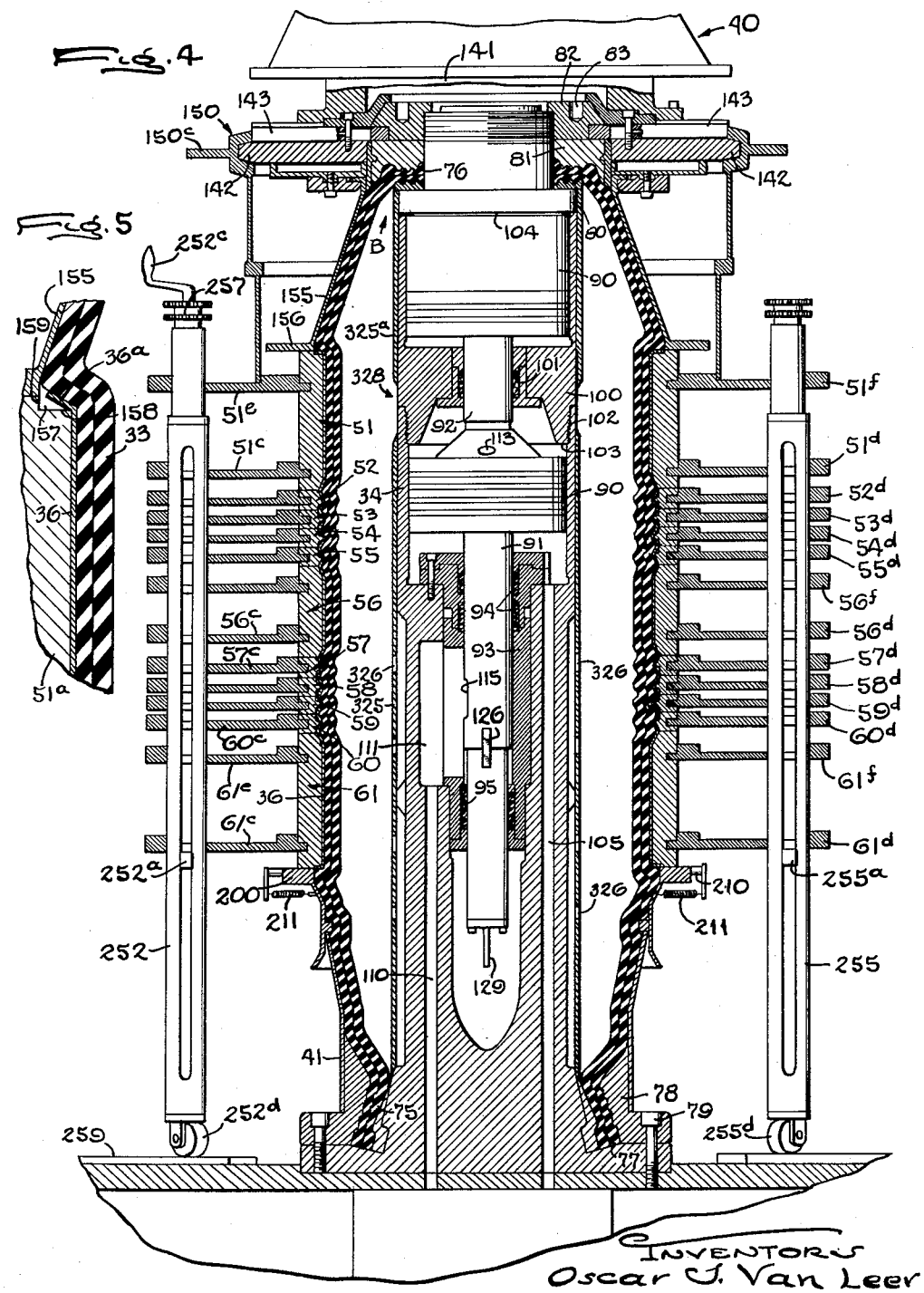

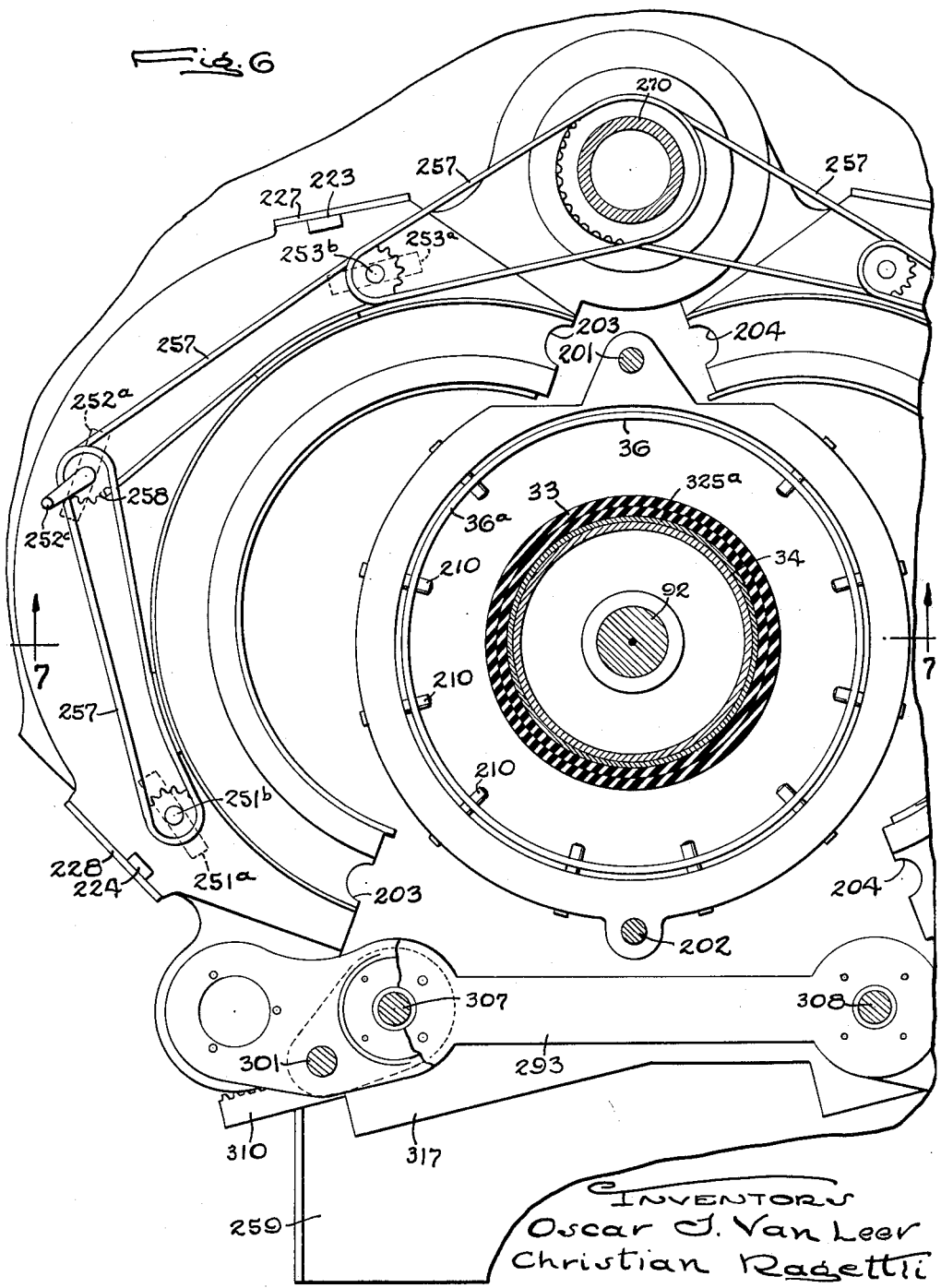

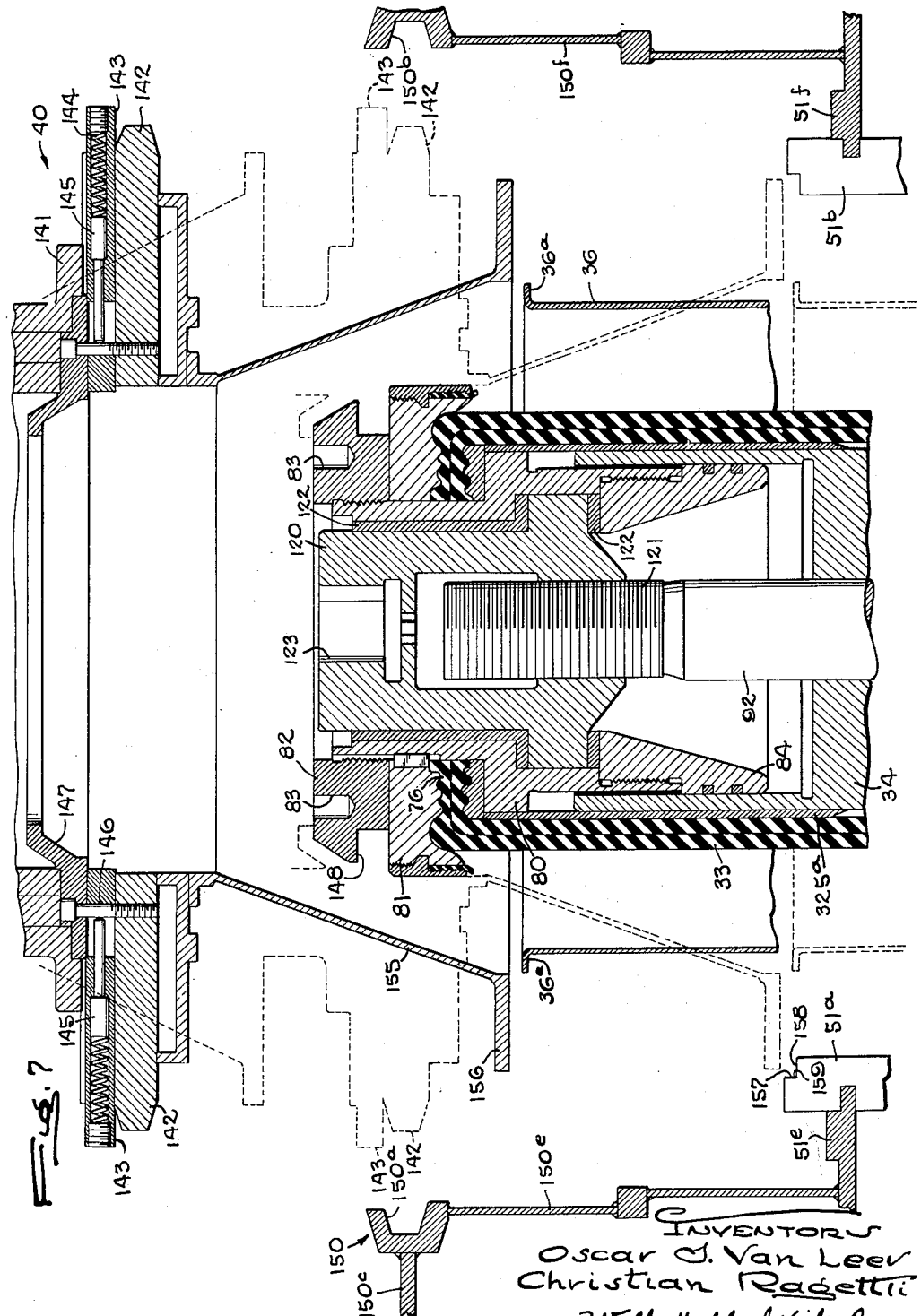

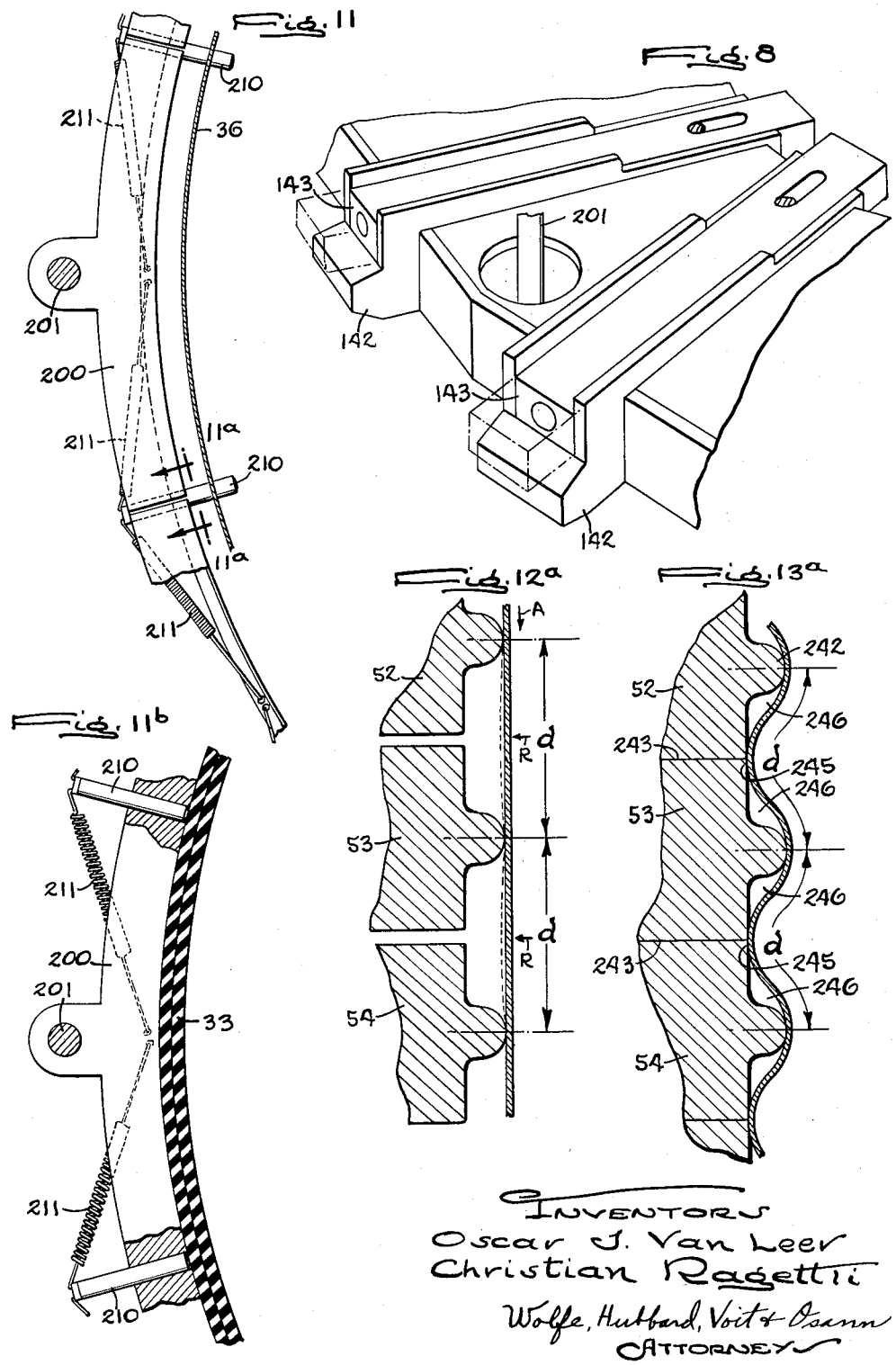

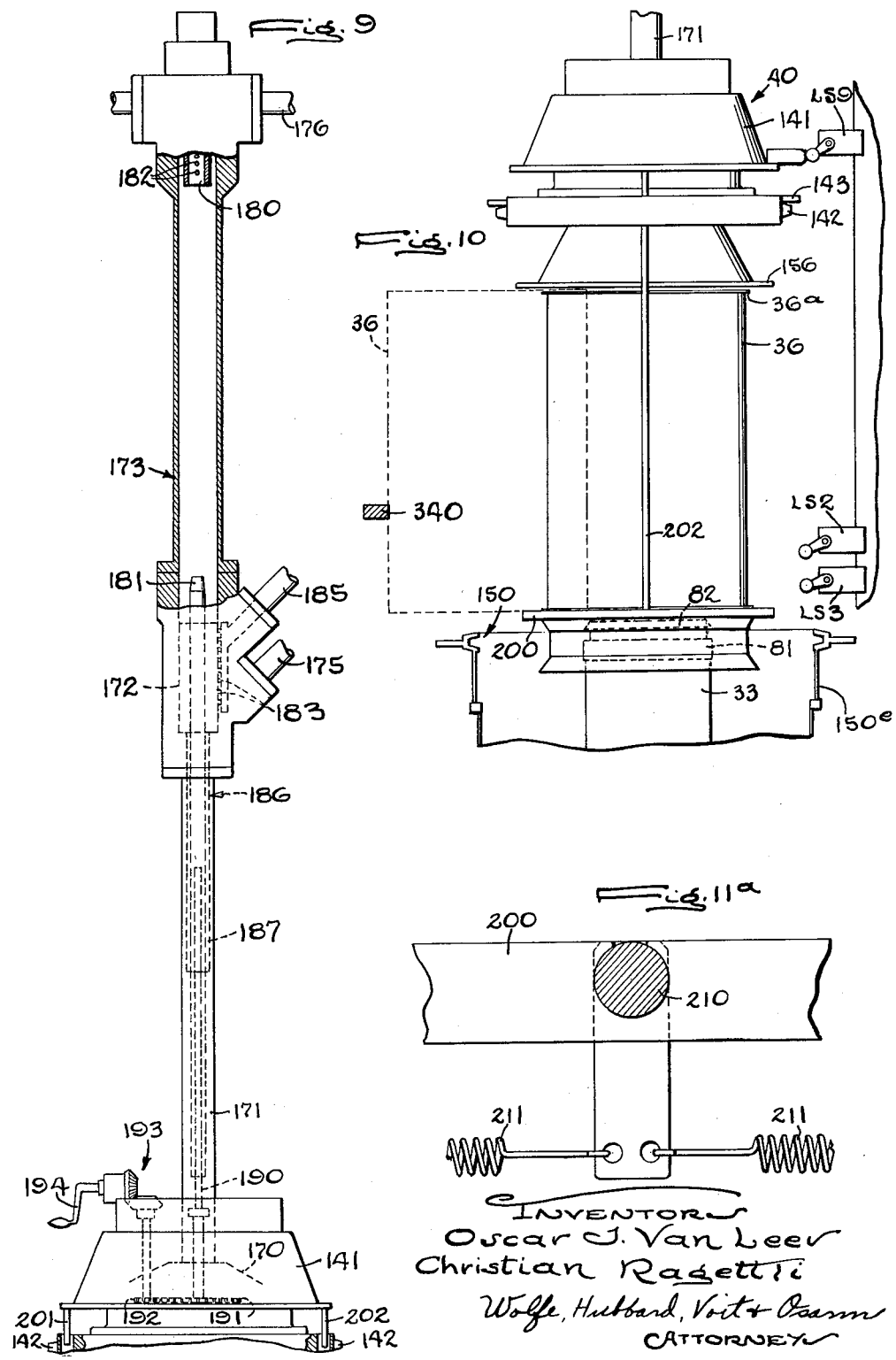

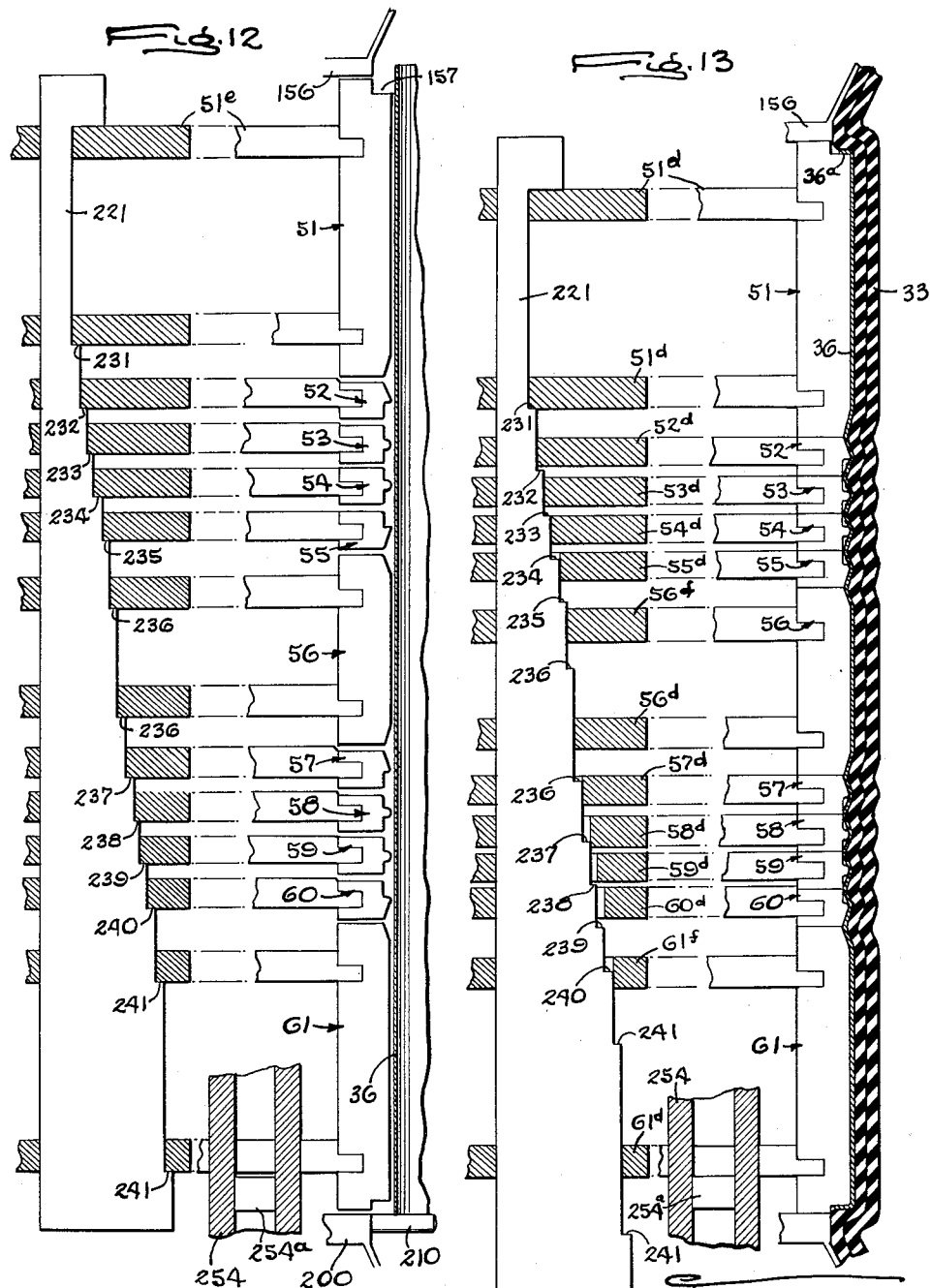

July 30, 1963  O. J. VAN LEER ET AL  3,099,311
PROCEDURE AND APPARATUS FOR MAKING DRUMS AND THE LIKE
Filed Nov. 2, 1959  14 Sheets-Sheet 10
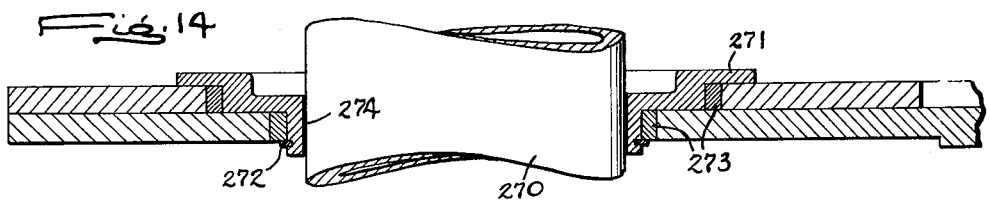
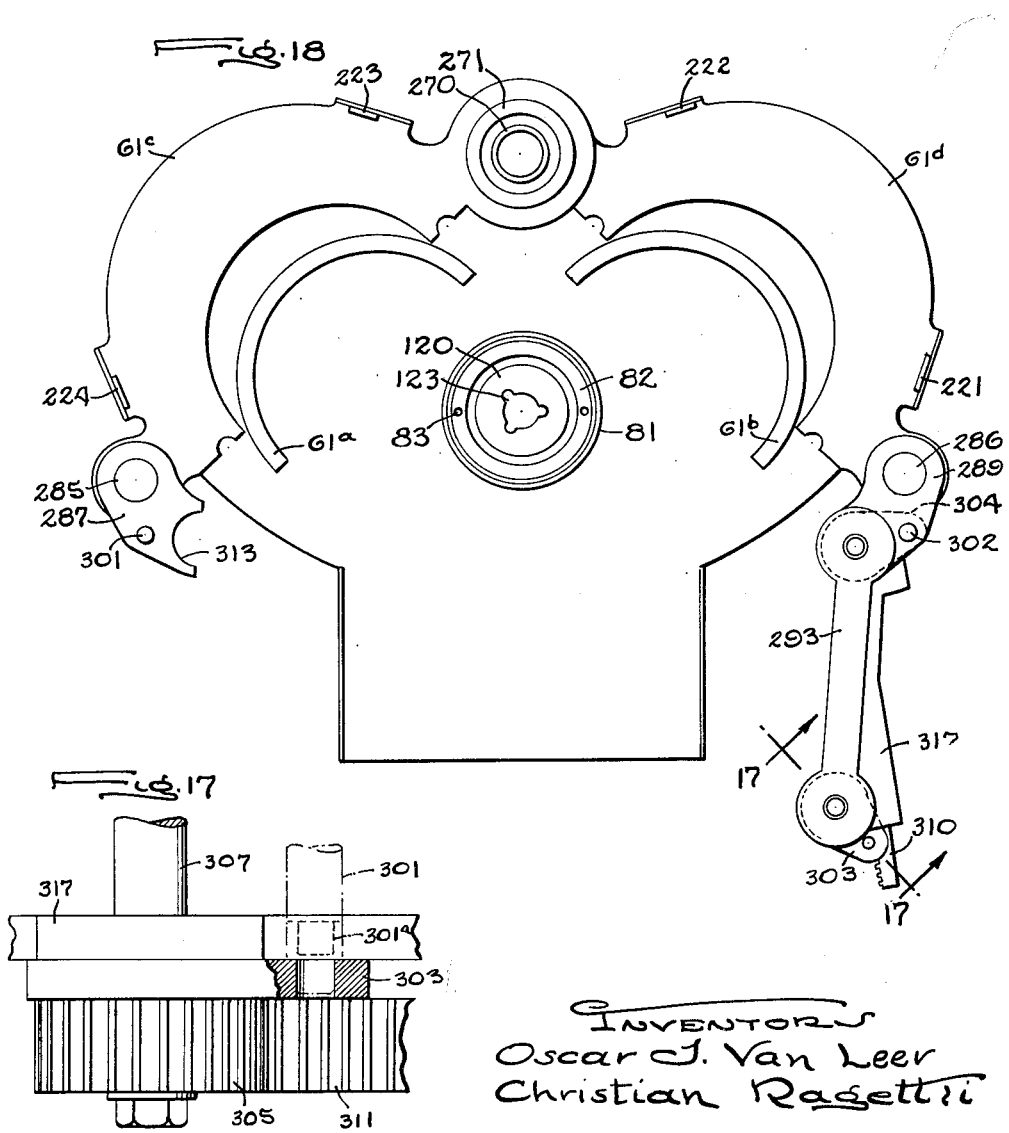
INVENTORS
Oscar J. Van Leer
Christian Ragetli
Wolfe, Hubbard, Voit & Osann
ATTORNEYS

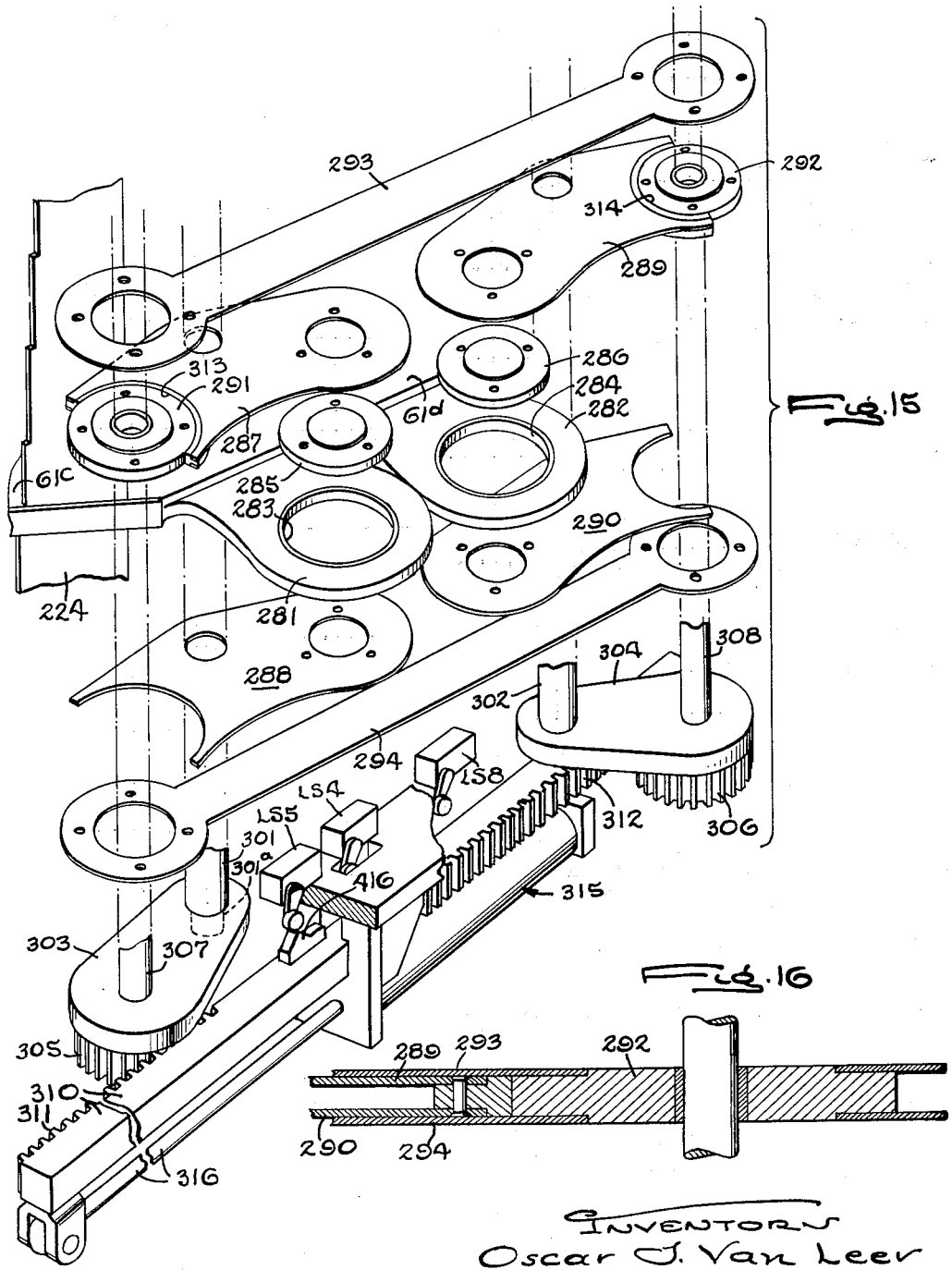

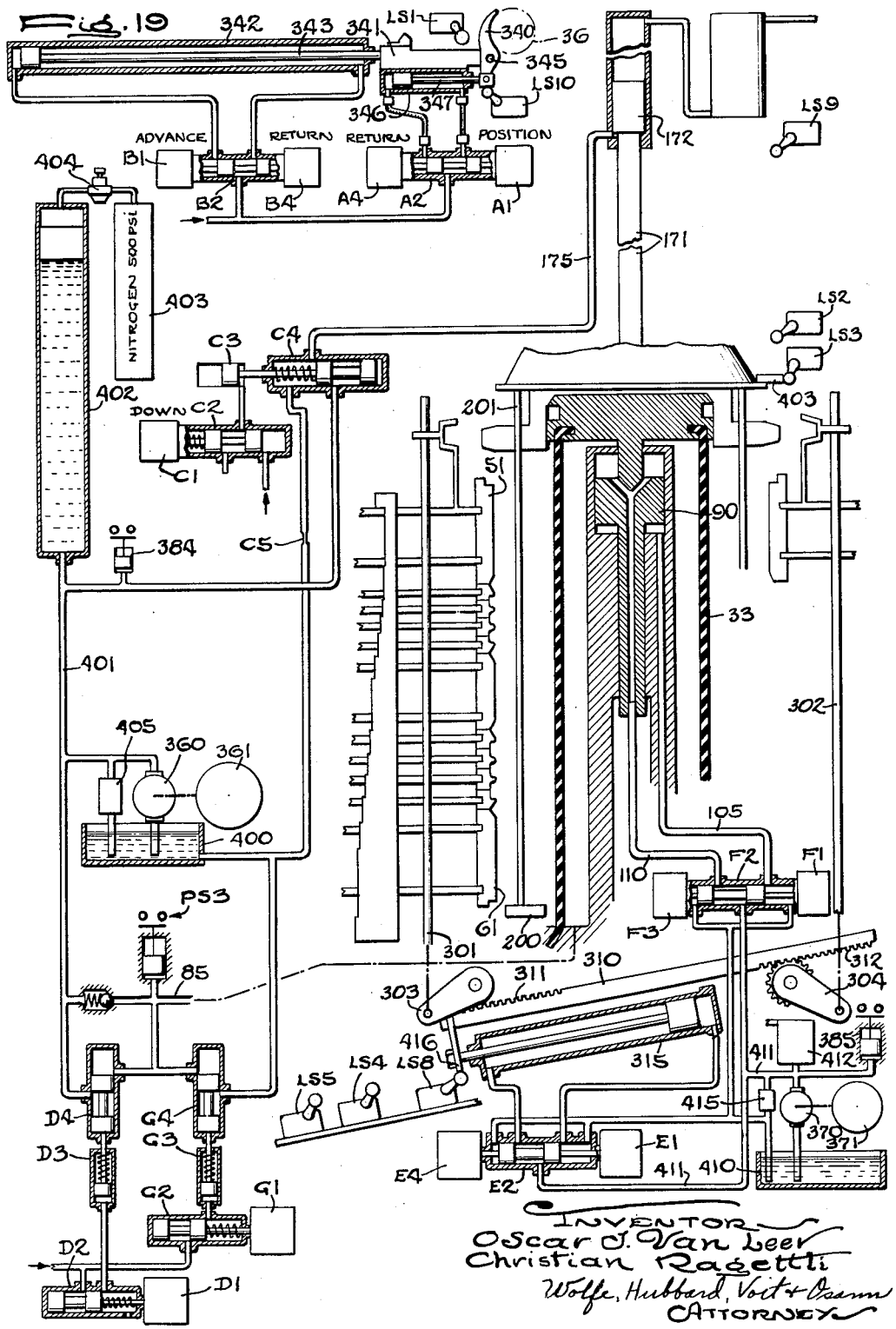

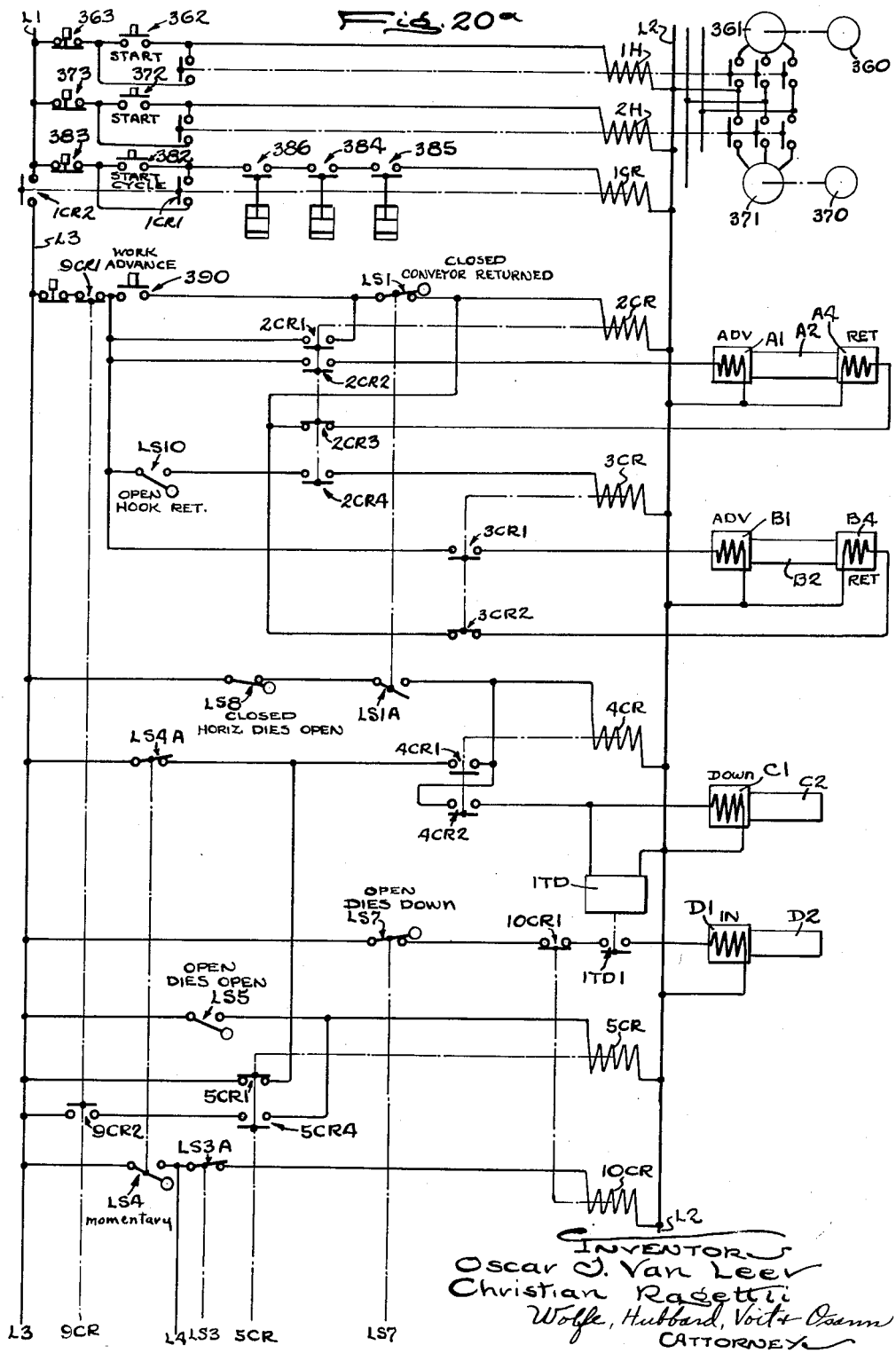

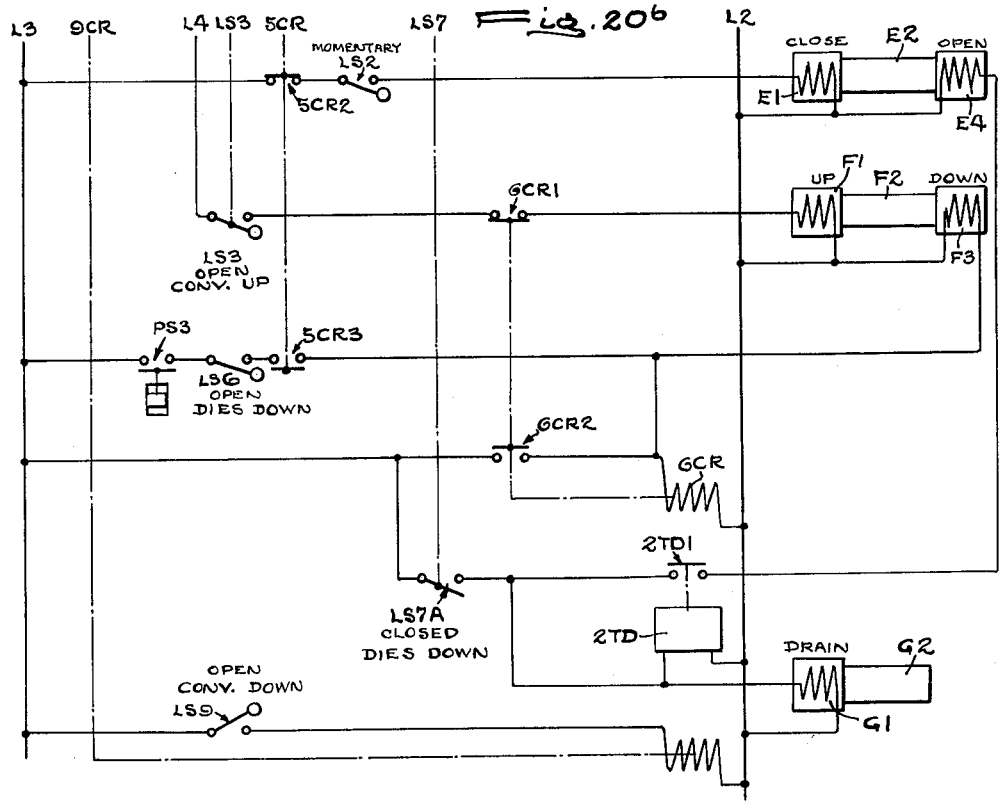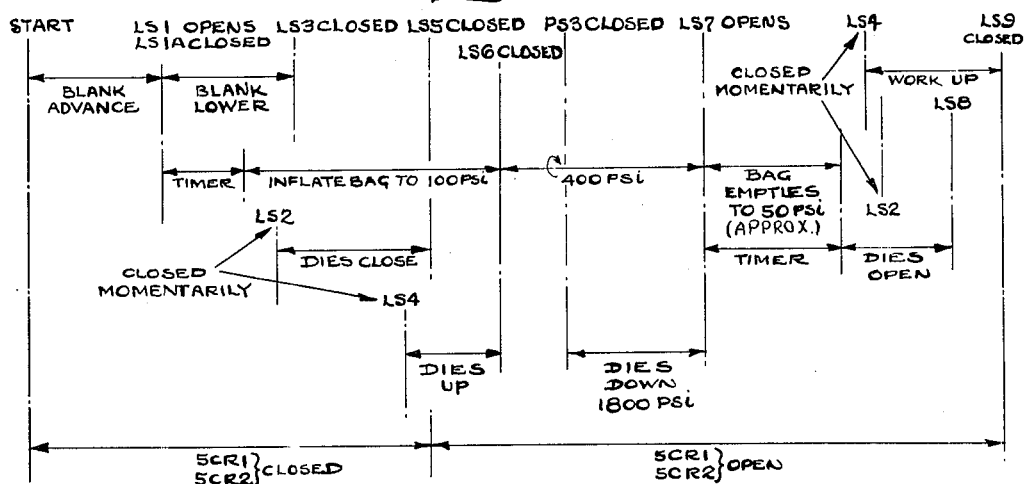

__United States Patent Office__  
3,099,311  
Patented July 30, 1963

3,099,311  
PROCEDURE AND APPARATUS FOR MAKING DRUMS AND THE LIKE  
Oscar J. van Leer, Barrington, and Christian Ragettli, Chicago, Ill., assignors to Grotnes Machine Works, Inc., Chicago, Ill., a corporation of Illinois  
Filed Nov. 2, 1959, Ser. No. 850,247  
27 Claims. (Cl. 153—73)

The present invention relates to the making of shipping drums and other cylindrical containers and more particularly to means for forming a beaded drum from a cylindrical metal blank.

It is an object of the present invention to provide a drum making machine which is capable of producing a completely beaded and flanged drum in a single operation ready for attachment of the end walls. It is another object to provide a drum making machine capable of producing beaded and flanged drums at a production line speed on the order of 500 per hour and at a cost which is only a fraction of that required using conventional machines and procedures.

It is an important object of the present invention to provide a drum making machine for forming reinforcing beads in the drum wall but which is capable of operating at relatively low hydraulic or other radially-applied pressures. It is a related object to provide a drum making machine in which only moderate hydraulic pressures are required to form even the deepest and sharpest beads that may be required in practice. To this end, it is an object to provide a procedure which requires the metal forming the bead to be stretched only in one direction, that is, peripherally but not longitudinally with a consequent sharp reduction in the amount of work which must be done to produce a bead of given depth. More specifically, it is an object to provide a drum forming procedure which involves spacing a series of dies along a blank, radially expanding the blank into contact with the dies by an inflatable bag, and then pressing the blank endwise while maintaining radial pressure to provide outward collapsing action of the metal forming the bead. It is another object related to the above to provide novel means for forcibly pressing a blank endwise to induce the collapsing action.

It is a further object of the invention to provide a novel arrangement of floating dies which are free to act independently but which nevertheless act in a coordinated fashion so that reduction in length occurs along the axis of the blank in accordance with the amount of metal required for bead forming purposes at each region along the axis. It is a related object to provide a bead forming procedure for a drum or the like in which deep beads may be formed without drawing down the wall thickness thereby to produce a bead having greater strength and greater resistance to deformation than beads produced by conventional procedures.

It is a further object of the invention to provide a drum forming machine which is substantially foolproof and in which all of the operations are carried out automatically in predetermined sequence, requiring only that the process be initiated by insertion of a blank into working position. More specifically, it is an object to provide a machine which employs movable or floating die elements and in which movement of the die elements in both directions is coordinated in a novel fashion with the pressure of the hydraulic fluid employed in expanding the blank. It is a related object to provide a drum making machine in which failure of the machine to complete a particular step in this sequence prevents the sequence from proceeding; thus a perfect and fully-formed drum is assured. It is another object to provide a novel sequencing arrangement which insures that the dies are closed and locked with the blank in predetermined position before the forming pressures are applied; hence it is an object to provide a machine which cannot dangerously malfunction but which can, on the contrary, be operated safely by unskilled personnel. In this connection it is an object to provide a drum making machine which may be successfully used in remote regions of the world where skilled mechanical help is scarce or unavailable.

It is a further object of the invention to produce a machine for making drums which is versatile and which is readily adaptable to form beads or flanges of any desired shape or contour. It is a related object to provide a machine in which the die elements may be used in any combination and spacing and which permits drums having a different length or diameter to be used simply by substituting a new set of dies and by a simple adjustment of the machine which can be accomplished in a few minutes time. It is a related object to provide a machine in which each die element is locked in closed position independently of the others but which permits all of the die elements to be opened, book-like, in unison for release of the completed workpiece or for changing the dies. In this connection it is a more specific object to provide a machine in which the die opening and closing means, while coupling the die elements together, does not prevent free endwise movement of the die elements.

It is still another object to provide a drum forming machine having peripheral dies cooperating with an hydraulically inflated rubber bag and in which the rubber bag is so constructed and supported that long production runs may be completed without necessity for changing the bag. It is a related object to provide a machine having an inflatable bag in which the resilience of the bag is utilized for immediate and substantially complete discharge of the hydraulic fluid at the end of the forming cycle thereby to minimize the time cycle of the machine. It is another object to provide a machine having a hydraulically inflated forming bag which is substantially prestressed and which is normally mounted on a supporting mandrel to facilitate replacement of a bag in the prestressed condition, with the bag and mandrel forming a unit.

In one of its aspects it is an object of the present invention to provide a drum forming machine capable of forming reinforcing beads in a cylindrical blank but in which the contact between the dies and the finished surface of the drum is such as to keep the surface intact and free of any scratches or blemishes even in the case of deep or sharply formed beads. In this connection it is an object to provide a drum making machine capable of producing perfectly formed beads but which does not require the outer surface of the beads to contact the forming dies except along narrow bands defined by the ridges of the forming dies and in which there is no possibility of relative movement or scraping between the dies and workpiece during the entire forming operation.

It is a still further object of the invention to provide in a drum making machine a novel head construction for supporting the upper end of a hydraulically inflated bag and which cooperates with the dies to apply pressure downwardly upon the blank and which is coordinated with application of hydraulic pressure within the bag to bring about a novel collapsing action in the bead portions of the drum wall.

Other objects and advantages of the invention will become apparent upon reading the attached detailed description and upon reference to the drawings in which:

FIG. 1 is a general side view of a drum forming machine constructed in accordance with the present invention.

FIG. 2 is a transverse section taken along the line 2—2 in FIG. 1.

FIG. 3 is a vertical section taken along the line 3—3 in FIG. 2 showing a blank in place but prior to expansion thereof.

FIG. 4 is a transverse section taken at right angles to FIG. 3 and along the line 4—4 in FIG. 2 showing the effect of expansion of the blank.

FIG. 5 is an enlarged fragmentary view showing the formation of a flange on the blank.

FIG. 6 is a transverse section taken along the line 6—6 in FIG. 1 but showing the die segments in the opened position.

FIG. 7 is a fragmentary transverse section of the upper portion of the machine taken along the line 7—7 in FIG. 6 with the operating position of the head shown in phantom outline.

FIG. 8 is a fragmentary view showing the head locking bolt construction.

FIG. 9 shows the means employed for lowering a blank into operating position and retracting the same.

FIG. 10 is a simplified diagram showing conveyance of a blank into position for lowering.

FIG. 11 is a fragmentary sectional view of the blank supporting means taken on the line 11—11 in FIG. 3.

FIG. 11a is a fragmentary section taken along the line 11a—11a in FIG. 11.

FIG. 11b is a view similar to FIG. 11 but showing the retreating movement of the supporting fingers as the bag is inflated.

FIG. 12 is a fragmentary vertical section taken along the line 12—12 in FIG. 2 showing the die spacing members with the die units supported thereon.

FIG. 12a is a diagram showing the initial spacing of the dies as in FIG. 12.

FIG. 13 is similar to FIG. 12 but shows the spacing member out of contact with the die units.

FIG. 13a is a diagram showing the dies bottomed and the beads expanded outwardly as in FIG. 13.

FIG. 14 is a fragmentary section taken through the hinge along the line 14—14 in FIG. 2.

FIG. 15 is an exploded view showing the linkage for operating the die carriers 61c, 61d.

FIG. 16 is a fragmentary section showing the manner in which the links are assembled to a link bushing.

FIG. 17 is a fragmentary view showing unstepping of the linkage for die replacement and taken along line 17—17 in FIG. 18.

FIG. 18 is a diagram similar to FIG. 6 but showing the die units swung wide apart for die replacement.

FIG. 19 shows the hydraulic circuit of the machine.

FIG. 20 is a schematic diagram of the electrical circuit in two parts 20a and 20b.

FIG. 21 is a sequence diagram for understanding the operation of the automatic control arrangement.

While the invention has been described in connection with a preferred embodiment, it will be understood that we do not intend to limit the invention to the specific arrangement shown but intend, on the contrary, to cover all modifications and alternative constructions included within the spirit and scope of the appended claims.

Referring now to the drawings and particularly to FIGS. 1–3, a drum forming machine 30 is disclosed constructed in accordance with the present invention. This machine includes a frame 31 mounting an annular die assembly 32 consisting of a plurality of bead-forming dies. Centered axially within the dies is a rubber bag 33 mounted on a post 34 and defining an annular work space 35 into which is received a cylindrical blank 36. Arranged above the supporting post 34 and cooperating with it is a head 40 which, among other functions, serves to retain and support the upper end of the bag when the bag is hydraulically inflated. A conical shell 41 surrounds the lower portion of the bag 33 to retain and support the lower end of the bag upon inflation.

The operation, broadly speaking, is as follows:

The blank 36 is inserted, the head being temporarily retracted to an out-of-the-way position. Fluid is then forced under pressure into the rubber bag 33 causing the bag to expand the cylindrical blank 36 outwardly into contact with the annular die assembly 32 so that the blank assumes the contour of the annular dies. The invention in the present case resides in certain important improvements on the above which, although they are closely interrelated and cooperate to produce a novel and highly successful result, will, for purposes of ready understanding, be discussed separately.

In carrying out the present invention the die assembly 32 consists of a number of vertically spaced, annular die units mounted for movement toward one another during the expansion portion of the cycle. The illustrated machine includes a total of eleven die units designated 51–61 inclusive. Each of the die units includes a die and a supporting member or carrier. Moreover, each die is segmented, in the present instance made in two segments or half circles, which have been identified in the drawings as 51a–61a and 51b–61b, respectively. For mounting the two-part dies segmented carriers, each spanning 180 degrees, are employed as indicated at 51c–61c and 51d–61d, respectively. Because of the axial length of the upper, central, and lower dies, these dies are provided with a dual carrier. Thus, in the case of the top die unit 51 the second carrier or support is formed in two segments 51e—51f. In the case of the middle die unit 56, the second supporting member is in two segments 56e and 56f, while in the case of the lower die unit 61, the additional support is provided by segmented members 61e—61f. While the die units 51–61 are all segmented or formed in separable parts, it will be assumed in the discussion immediately following that locking means are provided for holding the segments together in the form of a complete ring capable of withstanding radially applied pressure, and the discussion of the detailed means for separating the segmented dies and for locking them together will be reserved until a later point.

Detailed attention may next be given to the hydraulically inflatable bag 33 and the means for supporting it on the frame 31 centrally of the annular dies. The bag employed in the present invention is preferably of cylindrical construction having an integral mounting flange 75 at its lower end and a flange 76 at its upper end. The lower flange is seated in an annular recess 77 and held in place by means of a corrugated retaining collar 78 which is secured to the base of the post 34 by clamping bolts 79. At the upper end the flange 76 of the bag is clamped to the upper portion of the post, indicated at 80, by means of a corrugated retaining ring 81 held in place by a threaded collar 82. The collar has shallow holes 83 formed therein for engaging a turning tool so that the collar may be drawn tight against the ring 80. Thus the bag is sealed with respect to the post at both ends, against leakage of the hydraulic fluid pumped into it.

For the purpose of cyclically inflating the bag 33 with hydraulic fluid, such fluid is admitted, and discharged, through an enlarged inlet opening 85 at the base of the post, and the surface of the post is relieved as at 86 to provide an annular space through which the fluid may flow. It will be apparent that admission of the fluid to the inlet 85 causes the bag to balloon outwardly against the blank 36, with the resulting expansion of the blank against the dies causing it to acquire the contour of the dies as illustrated in FIG. 4.

However, in accordance with the present invention means are provided for initially spacing apart the die units 51–61 an amount which depends upon the depth of the bead to be formed and for mounting them so that they are free to come together during formation of the bead so that an outward collapsing action takes place during which the metal of the bead is required to stretch substantially in only one direction. In the present instance movement of the die elements and the upper end of the bag is brought about by making the post 34 capable of limited shortening and extension, with the upper end being movable with respect to the lower. To bring about such movement, the lower part of the post is made of hollow construction containing a piston 90 slidable therein and having a piston rod with a downwardly extending portion 91 and an upwardly extending portion 92. For guiding the movement of the lower portion of the piston rod and for providing an oil seal between spaced points thereon, a packing gland sleeve or insert 93 is provided having a first packing gland 94 and a second, downwardly spaced, packing gland 95.

For supporting the upper portion 92 of the piston rod, a hollow guide member 100 is provided which is in the form of a sleeve having an internal packing gland 101 and threaded as at 102, into the lower portion of the post so that it forms a rigid extension thereof, defining the upper end of the chamber in which the piston 90 operates. With the piston rod thus slidably supported at each end, it is free to move endwise. The movement of the piston is, however, limited. Bottoming in the upward direction occurs at 103 between the piston and the sleeve 100. Bottoming in the downward direction occurs at 104 between the sleeve and the upper, movable, portion 80 of the post.

To admit hydraulic fluid to the underside of the piston 90 to raise the piston, a "raise" conduit 105 is provided in the post 34 leading to the underside of the piston. Conversely, for causing the piston 90 to move downwardly, hydraulic fluid is applied through a "lower" conduit 110 which leads to a space 111 formed within the post and located between the packing blands 94, 95. A channel is provided within the piston and piston rod for conducting hydraulic fluid from the space 111 to a point above the level of the piston 90. This is accomplished in the present instance by making the piston and piston rod hollow and by providing fluid outlet openings 112, 113. For admission of fluid into the wall of the piston rod, a passage 115 is formed therein, while escape at the lower end of the rod is prevented by a plug 114. Accordingly, when hydraulic fluid is applied at the opening 110, it passes from space 111 into the piston rod through passage 115 for discharge at openings 112, 113. This causes movement of the piston 90 in the downward direction until bottoming occurs at 104. Applying fluid at the other opening 105 in like manner causes the piston to go up until stopped at 103.

For the purpose of adjusting the elevation of the upper portion 80 of the post when the piston in its fully upraised position (FIG. 3) i.e., when the piston is bottomed at 103, a threaded adjustment is provided between the piston rod and the member 80. Specifically, a captive nut 120 is provided in the member 80 having a thread which engages the threaded end 121 of the piston rod. To facilitate rotating the nut, an anti-friction lining 122 is provided. A square recess 123 permits rotation by a suitable turning tool. For holding the piston and piston rod against rotation when the nut is turned, the insert 93 is provided with keys 126 which slide in grooves 127 extending axially on the sides of the piston rod 91. It will be apparent that the position of the members 80–82, which are firmly clamped together and to the upper end of the bag, will depend upon the degree of engagement or overlap between the nut and the end of the piston rod.

Since the hydraulic fluid in the bag is under appreciable pressure, it will tend to escape into the post at the upper end. To prevent this, the upper post member 80 is provided with a skirt 84 having suitable packing rings and which slides piston-like within the guide member 100. However, any fluid which gets past the skirt, or any fluid which may escape through the packing gland 101 is drained off through a drain opening 128 at the upper end of the piston rod connected to a pipe 129 leading to a drain outlet 130.

In carrying out the invention a head assembly, indicated at 40, is provided for engaging the movable upper end of the post 34 following insertion of a blank into the work space, with the head being so constructed that when the post is shortened by application of hydraulic pressure, downward force is applied to the upper die unit 51 tending to press the upper portion of the blank 36 downwardly. This force, combined with radially applied pressure, induces a collapsing action with movement of the dies toward one another as will be discussed in detail at a later point. Attention may first be given to the construction of the head 40. As shown in FIG. 7, the head includes an annular frame 141 providing outwardly extending lugs 142 with locking bolts 143 radially slidable therein as shown in FIG. 8. The bolts are spring biased radially outward with respect to the lugs 142. To this end, each of the bolts includes a biasing spring 144 which reacts against a plunger 145 extending radially inward and bottomed as indicated at 146. Inside of the annular frame 141 is a locating flange 147 which is contoured to seat on the upper surface of the collar 82 at the upper end of the post. The collar is undercut, i.e., provided with an annular recess 148, for lockingly receiving all of the bolts 143 when the head 40 is seated on the post.

For the purpose of mechanically coupling the upper die unit 51 with the head, the upper die unit carries a head clamping member 150 including two semicircular grooved clamps 150a and 150b each having a semicircular supporting plate, 150c, 150d, respectively. As will be further described, the supporting members 150c, 150d, have locking linkage much the same as the locking linkage interconnecting the supports for the segmented dies. The clamp 150 is supported in vertical position upon semicircular supports 150e and 150f which are welded or otherwise secured to the supporting plates 51e, 51f associated with the uppermost die elements. As a detailed feature of the present invention, the outwardly biased bolts 143 are arranged in the path of movement of the head clamping members 150a, 150b when the latter are closed. As a result the head clamping members not only engage the locking lugs 142 on the head but also compress the bolts 143 inwardly into the annular recess 148 at the upper end of the head so that the head is securely locked to the upper, movable end portion of the central post.

For supporting and restraining the upper portion of the rubber bag 33, i.e., the portion which extends above the level of the annular dies, the head is formed with a conical recess. In the present instance this recess is defined by the skirt 155 having a flange 156. The minimum diameter of the skirt 155 is such that when the head 40 is lowered into operating position, the head closely embraces the retaining ring 81 on the post. The maximum diameter of the skirt corresponds to the maximum inner diameter existing at the upper edge of the uppermost annular die element. As shown in FIG. 5, the upper die element 51a is recessed as indicated at 157 and includes an adjacent shoulder 158 over which the metal of the blank is bent to form the flange 36a incident to expansion of the rubber bag. The recess terminates at 159, having sufficient radial depth as to accommodate the flange, and the lower edge of the supporting skirt 155 is preferably flush with the outer edge of the flange. Because of the crowding of the rubber above the flange, the rubber acts as a force-transmitting member in the axial direction, so that when the head and skirt 155 are moved downwardly, force is applied through the rubber to the flange. This insures that the upper end of the blank 36 will move downwardly in unison with the head. In addition to this, force is applied from the flange 156 of the head directly to the upper edge of the die elements 51a, 51b via the semicircular supports 150e, 150f. Since continued application of hydraulic pressure causes the upper portion of the blank to tend to conform to the profile of the upper die element, the latter are effectively locked together in the axial direction. The effect of the foregoing is that downward movement of the post, with the head 40 securely locked to it, acts to apply downward pressure upon the blank to promote the formation more or less simultaneously, of all of the beads in the series.

Further with regard to the head 40, the invention contemplates reciprocating the head between a lowered position in which the head may be engaged with the central post and an upraised position in which the head is clear of a cylindrical blank being laterally conveyed, by suitable conveying means, into a position above the annular work space. To understand the head transporting mechanism, reference is made to FIGS. 9 and 10. Here it will be noted that the head 40 includes a supporting framework 170 secured to a piston rod 171 coupled to a piston 172. The latter reciprocates in an elongated actuator cylinder 173 which is held in place by any suitable framing. The actuator cylinder has a "raise" inlet opening 175 and a "lower" inlet opening 176. In order to raise the head from the position shown in FIG. 9 to that shown in FIG. 10, fluid pressure is applied at the inlet opening 175 which applies pressure to the bottom of the piston 172 causing the piston rod 171 to move upwardly. To limit the extent of upward movement, a brake is provided at the upper end in the form of a cylinder 180 having a series of small apertures and which is engaged by a brake rod 181. Thus, when the rod 181 enters the cylinder, hydraulic fluid is expelled through the openings 182 bringing the assembly to a gradual stop. Similarly, at the lower end of the stroke the wall of the actuator is provided with a series of openings 183 through which hydraulic fluid is expelled to provide a cushioned stop in the "down" direction. The hydraulic fluid which is forced through the openings 183 escapes through an outlet 185.

To adjust the limit of upward movement, means are provided for changing the degree of extension of the brake rod 181 relative to the piston 172. For this purpose the brake rod 181 has a threaded connection with the piston 172. However, the threading is not within the piston 172 itself, but, rather, within an intermediate tube 186 having a threaded sleeve 187 at its lower end.

For the purpose of rotating the brake rod, a hexagonal drive rod 190 is provided which is coupled to a drive gear 191 driven by a pinion 192 which is in turn driven through bevel gears 193 having a crank operator or the like 194. It will be apparent that rotating the operator produces rotation of the drive gear accompanied by rotation of the hexagonal shaft 190 which turns the brake rod 181 by extending it more or less with respect to the piston 172 in which it is mounted. The greater the degree of extension of the brake rod, the less the head is upraised in the upward stroke. As shown in FIG. 10, the upraised position of the head 40 should be such as to just "clear" the upper edge of the incoming blank 36.

In one of the aspects of the invention, a blank supporting means is provided at the bottom of the drum making machine for determining the seated position of the blank in the machine but with a mechanical connection to the head 40 so that when the head is upraised, the support is raised to a level suitable for receiving a metal blank being laterally transported into position. In the present instance, the support is in the form of an annular platform 200 which is suspended from the head 40 upon adjustable rods 201, 202. As brought out in FIG. 6, the platform suspension rods 201, 202 are preferably alined with the parting line of the dies, with clearance being provided by notching out the opposed portions of the die supporting members of the die units 51–61, as indicated at 203, 204. This permits the platform 200 to be raised by the rods 201, 202 to the level shown in FIG. 10 each time the head is raised.

In order to support the blank 36 with respect to the platform 200 without interfering with expansion of the bag, incident to forming a flange at the lower edge of the blank, the annular platform is made quite narrow, and depressible radially extending pins or fingers 210 are provided as shown in FIGS. 11, 11a and 11b, pressed inwardly by springs 211. Each of these pins is loosely fitted in an opening or groove located at the top surface of the platform as shown in FIG. 11a, so that the upper surface of the pin is substantially flush with the platform. Thus, as the bag is expanded outwardly as shown in FIG. 11 incident to forming a flange 36b at the lower edge of the blank, the pins are forced against the biasing springs 211 into the retracted position shown in FIG. 11b. This arrangement has the advantage that the platform is capable of receiving a blank, lowering the blank into operating position, and retaining it there until acted upon by the bag with automatic pin retraction as the bag expands. The operating forces are sufficiently low so that the bag is not worn or damaged by the retreating action of the supporting pins. Later, when the bag is again collapsed, the pins move inwardly to resume their supporting function for withdrawal of the workpiece.

In accordance with one of the important aspects of the invention, means are provided for maintaining all of the die units 51–61 initially in spaced relation and with predetermined spacing between them until the blank engages the upraised portions of the dies, with the dies being freely mounted for axial movement, so that when the spacing means is withdrawn the dies are free to move toward one another. More specifically, means are provided for applying an axial force upon the blank following expansion of the blank against the spaced dies to promote foreshortening of the blank and movement of the dies into axially bottomed positions.

In the present instance the initial spacing of the die units is achieved by means of a series of stepped spacing members, or suspension plates, four in number, which are spaced about the periphery of the die units. The location of the stepped plates is shown in FIG. 2, with the plates being indicated in cross section at 221–224, inclusive. One pair of plates 221, 222 are hooked onto the die supporting member 51e, while the other pair 223, 224 are hooked onto the die suspension member 51f. They are maintained in place, top and bottom (see also FIG. 1), by removable retention plates 225–228, respectively.

In order to understand the construction of a typical one of the suspension plates, reference is made to FIG. 12, the plate 221 being taken as representative. Here it will be noted that it includes steps 231–241 for spacedly engaging the die supporting members associated with the die units 51–61, respectively. The die units thus hang in place, being seated on the respective steps in level position by gravity.

In a typical operating cycle the stepped suspension plates are raised by reason of extension of the central post 34 which raises the head 40 so that the die units are engaged one after the other, each raised into predetermined spaced relationship with respect to its neighbors. With the die elements occupying this predetermined spacing, the blank is expanded outwardly into frictional contact therewith following which contraction of the central post 34 occurs accompanied by downward movement of the head 40 and dropping of the stepped suspension members into the inactive position shown in FIG. 13. This leaves the die elements free to move toward one another until they finally are solidly bottomed together at the completion of the operating cycle.

With the spacing means in mind, more detailed attention may be given to the shape of the dies and the particular spacing which should be used between adjacent dies. In carrying out the present invention, each of the die elements has a central annular ridge so that two adjacent die elements, taken together, define an annular groove having a parting line at the region of greatest diameter. Taking three of the die units at random, for example, units 52, 53, 54, shown fragmentarily in spaced position in FIG. 12a and in bottomed position in FIG. 13a, the ridges are indicated at 242, with parting lines between the dies at 243. Moreover, the ridge-to-ridge spacing which exists between the die elements at the time of contact with the workpiece, and which determines the spacing of the steps on the suspension plates, is made equal to the "slant length" of the finished bead. First referring to FIG. 13a which shows the finished product, the slant length of the bead formed by cooperating die elements is indicated at d. By "slant length" is meant the length of the bead in the axial direction but as measured along a line parallel to the metal at each point. To achieve this result without requiring the metal to stretch in the axial direction, adjacent die elements are spaced apart so that the ridge-to-ridge distance between them is the same distance d. In understanding the transition between FIGS. 12a and 13a, it will be helpful to visualize the radial and axial forces acting upon the metal in the region of the beads. For convenience, the radial force may be indicated at R and the axial force at A. In practicing the invention the force R, which is applied radially outwardly by the rubber bag expands the blank into engagement with the ridges of the dies and thereafter causes a slight bulging of the metal between the ridges as indicated by the dotted lines. As the radial force is further increased by pressure build-up within the bag, the axial force A is applied, and the effect of the two forces acting together is to induce a collapsing action of the metal outwardly until the metal forming the bead bottoms in the region 245 centered between the ridges. This deformation requires stretching of the metal in the bead in only one direction, namely in the peripheral direction without the necessity for axial stretching since, as noted, the slant "axial" length of the bead metal remains the same throughout the process. In one of its aspects, it is a feature of the present invention that the expansion is carried out only to the extent of producing a smooth, round "balloon" contour without all-over "area" contact between the workpiece and the die elements, leaving spaces as indicated at 246 where there is no actual contact between the workpiece and the die elements. This degree of bead expansion, with the bead lightly bottomed at 245, in practice is easy to control by controlling the pressure within the bag, particularly so since carrying the expansion one step farther to produce complete conformity with the die would require use of substantially increased pressure.

Since there is no relative moving or scraping between the die elements and the workpiece incident to the bead formation, and since most of the bead area is at all times out of contact with the dies, the finish on the workpiece remains unmarred in the expanding process, making the procedure and apparatus especially well suited for use with pre-painted and pre-printed blanks.

It is one of the features of the present invention that the stepped suspension plates 221–224 may be readily removed and replaced by members having a different stepped contour and providing a different initial spacing between the die units. Thus, auxiliary supporting means are provided for raising the die units from below so that all of the units in the assembly are lifted clear of the steps which they normally engage. This is accomplished by a series of six supporting posts, three of which, 251–253, cooperate with the left hand or "a" die supporting members and three of which, 254–256, cooperate with the right hand or "b" die supporting members as shown in FIGS. 1 and 2, the posts being telescoped through alined openings provided in the die supporting members. The construction of all of the supporting posts 251–256 is substantially identical and may be understood taking the post 252 shown in FIGS. 2 and 4 as typical. Here it will be noted that the post 252 includes a movable supporting lug 252a which engages a threaded shaft 252b rotated by a crank 252c. Upon turning the crank, the resultant rotation of the shaft 252b raises the supporting lug 252a which engages and then raises the die supporting member 61c which is adjacent to it. In order to provide simultaneous and equal elevation by all of the supporting posts, the shafts thereof are coupled together by chains 257 engaging sprockets 258 at the upper end of each of them. It will be apparent that when the lowermost die supporting member, consisting of the two halves 61c, 61d, is uniformly raised, bottoming of the superimposed die elements upon one another starting with the lowermost will take place until all of the die units have been lifted clear of the stepped suspension plates, whereupon the latter may be removed and replaced.

To permit the posts to move when the dies are swung into open position, the posts 251–256 are provided with rollers 251d–256d at their lower ends which ride upon the table 259 of the frame.

In accordance with the invention, individual linkages are provided for locking each of the die units 51–61 together while permitting the die units to move or "float" with respect to one another and while providing for simultaneous actuation of all of the die elements, book-like, about a common hinge axis between the open and closed positions. Further in accordance with the invention, all of the operating linkages include over-center toggles capable of locking the die segments together, and maintaining them locked, in the face of large hydraulically applied radial pressures. First of all, it may be noted that all of the die supporting members are hinged about a common hinge post 270. This requires that cooperating die segments each be provided with relatively overlapping hinge extensions having alined central openings for receiving the post 270. In the case of the die supporting segments 61c, 61d, shown in FIG. 2, the overlapping extensions are indicated at 61g and 61h, respectively. Cooperating supporting segments are, as shown in FIG. 14, maintained captive on a common bushing 271 having a snap ring 272 and individual anti-friction liners 273. Clearance for free sliding action is provided, as shown at 274 between the bushing and the hinge post.

In the discussion which follows it will be understood that each pair of die supporting segments has substantially identical linkage. However, the linkages employed for operating the supporting segments 61c, 61d associated with die unit 61 have been illustrated in FIGS. 2, 15 and 16 and will be described as typical. To provide for connection of the locking linkage, the die supporting segments 61c, 61d are extended forwardly as shown in FIG. 2 to provide "eyes" 281, 282, respectively, having openings 283, 284 (FIG. 15). Mounted within each of the openings 283, 284 is a disc or insert as indicated at 285, 286, respectively. Secured to the insert 285 and sandwiching the eye portion 281 of the die holder segment between them is a pair of toggle levers 287, 288 which act is unison and which therefore can be considered as a unit. Similarly sandwiching the eye portion 282 are toggle levers 289, 290 which also act as a unit. At their outer ends as viewed in FIG. 15, the levers 287, 288 together engage a bushing 291 while the remaining pair of toggle levers 289, 290 engage a bushing 292. Spanning the bushings 291, 292 and connected to opposite sides of such bushings are tension links 293, 294. The toggle levers 287, 288 and 289, 290 are so formed as indicated in FIG. 2 that the centers are all in substantial alinement and preferably slightly over center when the die holder segments are in the illustrated closed position. In this position the tension links 293, 294 crowd the toggle links, and the associated die supporting members 61c, 61d, inwardly. Conversely, any tendency for the die holder segments to separate will be resisted by tension developed in the links 293, 294, the latter being made of high grade steel so that positive locking is assured for all bag pressures.

In carrying out the invention, all of the toggle levers associated with the various die units are interconnected by operating shafts so that the levers on each side are rotated in unison in order to "break" all of the toggles and so that the toggle levers are rotated end for end with the result that the tension link connections are on the inside (FIG. 6) rather than being in the outside or locking position (FIG. 2). Referring to FIG. 15, the operating shaft associated with the left hand die supporting segments is indicated at 301 and that associated with the right hand segments is indicated at 302. In accordance with one of the more detailed aspects of the present invention, means are provided for swinging the operating shafts bodily through an arc centered about the points of connection of the tension links so that all of the toggle levers undergo simultaneous swinging movement in the unlocking direction. To this end, the operating shafts 301, 302 are mounted on arms 303, 304 having integral gears 305, 306 respectively. A second set of shafts 307, 308 are provided alined with the gears and telescoped over the ends of the tension links for keeping them in alinement. To operate the gears 305, 306, they are engaged on opposite sides by a common rack member 310 having a first rack 311 and a second rack 312. For the purpose of moving the rack member 310 endwise an actuator 315 is provided having a plunger 316 mounted on a supporting plate 317 which interconnects the link alinement shafts 307, 308.

When the locking mechanism is in its closed or locked position, shown in FIGS. 2 and 15, the rack member 310 occupies the left hand position with the actuator plunger 316 extended. Applying hydraulic pressure to the actuator 315 causes the rack member 310 to move to the right thereby swinging the arm 303 counterclockwise and the arm 302 clockwise. The toggle levers which are connected to the arms by the shafts 301, 307 and 302, 308 undergo corresponding movement. This causes the pivot axes of the tension links to move in a direction outwardly of the machine and away from dead center. Continued rotation of the toggle levers end-for-end causes the pivot axes of the tension links to be rotated around to the "inside" position as shown in FIG. 6 with the eye portions 281, 282 of the die supporting segments being thrust apart, rocking away from one another about the hinge post 270. Since the movement of all of the toggle levers in the system is tied together, all of the right hand die supporting segments will move as a unit away from all of the left hand die supporting segments, so that the segments seem to "open like a book."

Assuming that the blank has been deformed into the dies, the retreating movement of the die elements will cause the blank to be freed so that it may be axially retracted by raising the head 40 of the machine and the supporting platform 200 into the elevated position shown in FIG. 10. With the completed drum transported out of the way by a suitable conveying means, a new blank is transported into receiving position and lowered into operating position, and the dies may be closed, as previously described.

In accordance with one of the aspects of the invention, means are provided for unstepping the locking linkage to permit the die segments to be swung wide apart and thereby to facilitate removal of a particular set of die elements and substitution of another set. This is accomplished by causing the toggle levers 287, 288 and 289, 290, to be made open-ended as illustrated in FIG. 15 and by permitting the shaft 301 to be unstepped from the arm 303 which normally receives it.

Thus, instead of the toggle levers holding the ends of the links captive, the levers are open or forked at the link engaging end, presenting outwardly facing bearing surfaces 313, 314. The latter seat upon, and normally press against the link bushings 291, 292.

The disengageable connection between the toggle lever shaft 301 and the arm 303 is shown in detail in FIG. 17. Here it will be noted that the shaft 301 has a reduced portion 301a which fits into the opening in the end of the arm 303 and which may be withdrawn from the opening. In use, the linkage is first operated by the actuator 315 so that the open ends of the toggle levers face inwardly as in FIG. 6. Moving the shaft 301 upwardly through a small distance causes it to be unstepped from the lever 303 following which the tension links and associated actuator assembly may be swung clear of the opening as shown in FIG. 18.

With the tension links no longer limiting the outward swinging movement, the die holder segments may be swung open a sufficient distance to enable the die segments carried thereby to be freed. Each of the segments is easily manipulated and may be pulled forwardly by an operator (FIG. 18) followed by replacement by a new set of die elements. With the new set of dies installed, the die holder segments and tension links may again be swung into the position shown in FIG. 6. The toggle levers are seated against the link bushings followed by a seating in place of the toggle lever shaft 301 into the arm 303. This done, the mechanism may be operated normally by the actuator 315 between its open and closed conditions.

Prior to referring to the control circuits and procedures, more detailed mention may be made of the construction of the rubber bag 33. In accordance with the present invention, the bag is preferably made in form of a tube having a smaller diameter than the diameter of the post 34 on which it is used. In other words, the bag material is pre-stressed, thereby to forcibly expel the hydraulic fluid from the bag when the pressure at the inlet is released. The amount of pre-stress is preferably on the order of 35%, i.e., the rubber bag must be increased in diameter to approximately such extent in order to install it in operating position within the drum making machine.

In order to facilitate replacement of the rubber bag without having to stretch it over the central supporting post, such bag is provided with a supporting mandrel 325 in the shape of a cylinder having apertures 326 for passage of the hydraulic fluid. Since the upper end of the bag is required to move with respect to the lower end as the post is extended and contracted, the mandrel is preferably formed in two sections, with the upper section being indicated at 325a and with a gap 328 between the two. The ease with which a bag and mandrel may be installed in the machine will be apparent upon consideration of FIG. 3. First of all, the head is withdrawn to the completely upraised position illustrated in FIG. 10. Following this the threaded collar 82 is unscrewed and the bag retaining ring 81 is removed. This frees the upper flange 76 of the bag. At the lower end of the bag the screws 79 are removed which frees the retaining collar 78, allowing the flange 75 to be freely withdrawn. The bag, tightly clinging to its mandrel 325, 325a, is then withdrawn axially from the machine and a new bag and mandrel substituted therefor. It will be apparent that the new bag may be sealed to the post simply by restoring the sealing rings in position top and bottom. Changing a mandrel-mounted bag takes only a matter of minutes, minimizing the time during which the machine is out of service.

While the bag has been shown as made up of two separate plies, any number of plies may be used. If desired a third or outer ply may be added in the form of a tube of firm, scuff-resistant rubber in order to withstand the abrasion of repeated contact with the drums on a production line basis. Employing high quality rubber many thousands of drums may be formed using the same rubber bag.

The above discussion has been directed primarily to the elements which act upon the blank 36 after it has been moved into the position illustrated in FIG. 10 for subsequent lowering and expansion. However, prior to referring to the overall control circuit, mention must be made of the means employed for advancing a blank into the illustrated position of readiness. A mechanism for accomplishing this is shown diagrammatically in the upper left hand corner of FIG. 19 for purposes of easy understanding. It is assumed in the discussion that follows that blanks are supplied from the left (FIG. 10) on a conveyor or the like. In the present instance, a hook 340 is provided for engaging a blank 36 and for moving the blank to the right, ready for the lowering operation. The hook 340 is bodily carried on a carriage 341 which is moved back and forth by an actuator 342 having a plunger 343. In the position illustrated in FIG.

19, the hook is shown in its left hand position and the actuator is retracted. It is, of course, necessary for the hook 340 to get on the back side of the next blank series so that it, too, may be pushed into the position of readiness. For this purpose, hook retracting means is provided on the carriage 341 and the hook itself is pivoted at its "near end" as indicated at 345. To rotate the hook about its pivot, a hook retracting actuator 346 is employed having a plunger 347, the arrangement being such that when the plunger is retracted the hook is in the illustrated operating position. It will be apparent from FIG. 19 that the step by step operating sequence of the blank advancing means is as follows: Initially both actuators occupy the positions shown. The actuator 342 is then pressurized at its left hand end to move the carriage 341 to the right advancing the blank 36. The actuator 346 is then pressurized at the left to rotate the hook backwardly through approximately 90°, i.e., out of the path of movement of the blanks. The actuator 342 is next pressurized at the right hand end to return the carriage, following which the auxiliary actuator 346 is pressurized at its right hand end to rotate the hook 340 clockwise into its operating position behind the next blank in the series. The solenoid valves employed to bring about this operating sequence as well as the operation of the associated interlocking switches will be discussed in detail in the following section.

*Control Procedures and Circuitry*

In order to understand the manner in which all of the various parts of the drum making machine are integrated to produce the finished product, and to understand the novel sequence of events employed to produce the product in the shortest time, reference is made to the hydraulic circuitry set forth in FIG. 19, the electrical control circuits set forth in FIGS 20a, 20b, and the sequence diagram illustrated in FIG. 21.

To provide hydraulic pressure at two different pressure levels, a low pressure pump 360 is provided driven by a motor 361 which is turned on and off by a contacter 1H under the control of the "start" pushbutton 362. Current for operating the contacter is provided by input lines or busses L1, L2. Conventional sealing in contacts on the contacter maintain the circuit closed and the pump in operation until such time as a stop or drop out pushbutton 363 is pressed. High pressure hydraulic fluid is provided by a pump 370 driven by a motor 371 which is operated by a contacter 2H under control of pushbuttons 372, 373.

To start the cycle a control bus L3 is provided which is connected to the bus L1 by a "start cycle" pushbutton 382 in series with a drop out pushbutton 383. Pressing the pushbutton 382 energizes the coil of the relay 1CR, provided that there is adequate pneumatic and hydraulic pressure to operate the system. Thus, three pressure switches are placed in series with the relay coil, a low pressure hydraulic switch 384, a high pressure hydraulic switch 385 and a pneumatic switch 386. Closure of the relay 1CR closes the sealing in contacts 1CR1 and the bus energizing contacts 1CR2.

With the control bus L3 energized, the blank is advanced into the position shown in FIG. 10 by pressing the "work advance" pushbutton 390 in series with a "work advance" relay 2CR. The circuit is sealed in by contacts 2CR1 on the latter. Contacts 2CR2 are closed. This energizes a hook positioning solenoid A1 to shift a valve A2 and moves the plunger 347 which rotates the hook 340 into operating position behind the blank 36 (see FIG. 19). At the same time contacts 2CR3 on the relay 2CR insure that the opposite solenoid A4 is deenergized.

To operate the blank advancing actuator 342, a relay 3CR is provided which alternately energizes an advance solenoid B1 or a return solenoid B4 which in turn controls an air valve B2 for admission of air either on the right or left hand side of the actuator 342. However, two prerequisite conditions must be met before the relay 3CR may be operated. This relay is in series with contact 2CR4 of the relay 2CR and also in series with a limit switch LS10 which is actuated by the hook 340 when in operating position. Thus with the hook in readiness, the relay 3CR is energized closing contacts 3CR1 thereon which energizes the advance solenoid B1 causing the hook carriage 341 to be thrust to the right. During this operation, the contacts 3CR2 are open so that the opposite solenoid B4 is deenergized. The above deposits the blank in the position shown in FIG. 10.

This position is detected by the opening of a limit switch LS1 which is in series with a relay 2CR which initiated the cycle. Dropping out of the relay 2CR causes the making of contacts 2CR3 and the breaking of contacts 2CR2 so that the hook retracting solenoid A4 is energized, thereby to swing the hook 340 into the retracted position. Dropping out of the relay 2CR also serves to open circuit the relay 3CR causing contacts 3CR2 to be made and contacts 3CR1 to be broken. Accordingly the return solenoid B4 is operated causing admission of air to the actuator 342 driving the actuator plunger to the left adjacent the next new work blank. In this position the limit switch 2CR1 is open so that both of the return solenoids A4, B4 are deenergized.

In addition to the opening the limit switch LS1 as discussed above, arrival of the blank also serves to close limit switch LS1A, the contacts of which may be located in the same enclosure as LS1 to initiate lowering of the blank into working position. Lowering is accomplished by energization of a relay 4CR through a closed limit switch LS8 which indicates that the dies are open. The relay 4CR has sealing in contacts 4CR1 to maintain the relay closed. In the present instance, lowering occurs by reason of venting the space below the elevating piston 172 (FIG. 9) via the line 175. To accomplish this, contacts 4CR2 are provided on the relay 4CR which energize a "down" solenoid C1 controlling a valve C2. Air is vented from an air cylinder C3 which controls a hydraulic valve C4. The spool of this valve is spring moved to the right hand position which connects the line 175 to a drain line 395, which in turn is connected to a sump 400. A restriction C5 is provided in the drain line 395 so that the blank conveyor platform 200 descends at a desired rate, bringing the blank 36 into the operating position shown in FIG. 3. A limit switch LS9 is opened as the platform descends and the dog 403 is moved away from the switch energizing a relay 9CR and opening a switch 9CR1 which deenergizes the circuit to the "advance" pushbutton 390. Accidental starting of the work conveyor is thus prevented. A switch 9CR2 is also closed to prepare a circuit for an interlock relay 5CR.

In order to allow a predetermined time interval prior to admitting hydraulic pressure to the rubber bag, a time delay relay is provided as shown at 1TD and which is in parallel with a "down" solenoid C1 which initiates the lowering movement.

Prior to referring to inflation of the rubber bag, further reference may be made to the low pressure hydraulic system. This system takes hydraulic fluid from the sump 400, pressurizes it in the pump 360 and feeds it into a manifold 401 having an accumulator 402. Pressure is maintained in the accumulator by a nitrogen flask 403 which is connected to the accumulator by a constant pressure regulator 404. A bypass valve 405 is connected to the output of the pump 360 so that hydraulic fluid is returned to the sump when the pressure exceeds, say, 450 p.s.i. The arrangement is such as to provide the large amount of pressure required for filling the bag at a sustained pressure even though the pump 360 may be of relatively low volumetric capacity.

Upon closure of the contacts of the time delay relay 1TD, we are assuming that certain other conditions are met as will be discussed, entry of hydraulic fluid into the bag is initiated by the solenoid D1 which controls an air valve D2. The latter admits air to an air actuator D3 which controls an hydraulic valve D4. When the spool of the hydraulic valve D4 is moved to its upper position (FIG. 19), the fluid manifold 401 is connected to the bag conduit 85 (FIG. 3), so that inflation of a bag begins. It begins and proceeds at a rapid rate because of the fluid available in the accumulator 402.

When the blank 36 which is being lowered is about one inch from its lowermost position, the dog 403 passes a switch LS2 (FIGS. 10, 19, and 20b) which is closed momentarily. This actuates the high pressure hydraulic system shown in the lower right hand portion of FIG. 19.

Such hydraulic system includes a sump 410 which furnishes fluid to the high pressure pump 370 which supplies a high pressure manifold 411 having an accumulator 412 and a pressure relief valve 415.

Closure of a switch LS2 (FIG. 20b) energizes a solenoid E1 controlling a four way hydraulic valve E2. The latter is connected to the actuator 315 which horizontally opens and closes the dies. As a result, hydraulic fluid is admitted so that the dies begin to close.

During closure, a switch LS4 (FIGS. 15, 19 and 20a) is momentarily closed as a dog 416 passes the actuator of the switch. This completes a circuit to the line L4 and the then closed switch LS3 (FIGS. 10, 20b) and through the normally closed contacts of a relay 6CR1. LS3 is so arranged as to be closed when the conveyor is down. Consequently, the head elevating solenoid F1 is energized which actuates the four way valve F2 supplied from the high pressure manifold 411. The valve causes high pressure fluid to be supplied to the conduit 105, causing the head to move upwardly in a direction to vertically space the die elements.

In the event that the blank had not been completely lowered, the switch LS3 would remain open and its companion switch LS3A would remain closed. Under such circumstances, the closing of switch LS4 would energize a relay 10CR opening contacts 10CR1 in series with the bag inflating solenoid D1 to terminate the flow of fluid to the bag.

When the dies swing horizontally to a completely closed position, switch LS5 (FIGS. 15 and 19) is closed, energizing the interlock relay 5CR (FIG. 20a). This opens interlock contacts 5CR1, and the relay is "sealed in" via contacts 5CR4. Contacts 5CR3 are closed to condition the circuit to the head lowering solenoid F3. When the dies are completely raised, a switch LS6 is closed (FIG. 1) to further condition the circuit supplying the solenoid F3. During this time pressure in the bag has been building up and in a practical case may be about 100 pounds p.s.i. A pressure switch PS3 is included in the circuit of solenoid F3 so that when the pressure reaches approximately 400 pounds p.s.i., the head lowering solenoid F3 is actuated, which switches the valve F2 to its opposite condition in which pressure is applied to the conduit 110 and the previously pressurized conduit 105 is connected to the sump. The head thus begins to lower, permitting the individual dies to approach one another. Simultaneously with the energization of the solenoid F3 a relay 6CR is energized which deenergizes the alternate solenoid F1. Energization of relay 6CR also closes contacts 6CR2 which closes a circuit around the switch LS6, PS3, and 5CR3.

As a result of the above, i.e., the continued inflation of the bag combined with the downward movement of the head and approach of the dies, the cross section of the blank changes from that shown in FIG. 12a to that shown in FIG. 13a.

When the dies are completely bottomed against one another indicating that deformation is complete, a switch LS7 (FIGS. 1 and 20a) is opened. This deenergizes a solenoid D1 which releases air pressure from the cylinder D3 causing the valve D4 to switch to the blocked position, thereby shutting off any further flow of the fluid to the bag 33. The companion switch LS7A (FIG. 20b) is closed to initiate operation of a time delay relay 2TD to energize a solenoid G1 for draining of the bag 33. As will be noted in FIG. 19, the solenoid G1 is connected to an air valve G2 which operates the air cylinder G3 which in turn controls an hydraulic drain valve G4. Thus when solenoid G1 is energized, air is admitted to the cylinder G3 and the conduit 85 supplying the bag is connected to the sump 400. Draining of the bag occurs rapidly because of the above mentioned prestressing of the rubber of which the bag is formed. The timer 2TD is set so that when the bag pressure falls to a low value on the order of 50 pounds p.s.i., contacts 2TD1 are closed. This completes a circuit to the die opening solenoid E4, thereby causing switching of the valve E2 so that the dies begin to swing horizontally to the open position.

During the opening of the dies the switch LS4 is again momentarily closed. The switch LS4A associated therewith is opened. At this time the switch 5CR1 is open, so that opening of the switch LS4A deenergizes the solenoid C1. This causes the hydraulic valve C4 to be shifted to the "up" position so that the elevator 200 moves the completed workpiece upwardly. During the upward movement, the switch LS2 is again closed; however, at this time the switch 5CR2 is open so that this is an idle motion. When the elevator reaches the top, the switch LS9 is opened. This deenergizes the relay 9CR. Contacts 9CR2 on the latter open, thereby deenergizing the relay 5CR which completes the cycle. Contacts 9CR1 which are in series with the "work advance" pushbutton 390 are closed by reason of drop out of relay 9CR so that the next blank can be advanced and the finished workpiece removed.

The overall function of the control system described above may be conveniently visualized by reference to FIG. 21. Here it will be noted that as the blank is passed into position, lowering begins immediately. However, before the blank reaches its lowermost position, inflation begins and the dies begin to swing closed horizontally. During the course of inflation, the dies spread apart vertically, but they must be completely spread before high pressure fluid, on the order of 400 pounds p.s.i. can be applied. After the workpiece has been completely formed, the bag is deflated. Note however, that the dies begin to open horizontally under the control of a timer which is initiated at about the time that the bag pressure falls to 50 pounds p.s.i. Thus, there is no necessity for waiting until complete deflation before opening the dies. The overlapping of functions permitted by the above control circuit insures a minimum time cycle, yet the various steps are all protectively integrated in a novel fashion so that failure of performance of any one step cannot jeopardize either the machine or the operator.

We claim as our invention:

1. In a drum making machine for forming annular beads in a cylindrical blank, the combination comprising a frame, a plurality of segmented annular dies in said frame, a cylindrical rubber bag centered with respect to said dies, a central post extending the length of the rubber bag for supporting the latter, means for sealing the bag to the post top and bottom, means for applying hydraulic pressure within said bag so that the blank is expanded outwardly to take the form of said dies, said dies being floatingly mounted on said frame so that they are free to axially approach one another for foreshortening of the blank as the blank is deformed outwardly to form said beads.

2. In a drum making machine for forming annular beads in a cylindrical blank, the combination comprising a frame, a plurality of segmented annular dies in said frame each having a central ridge, a cylindrical rubber bag centered with respect to said dies, a central post for supporting said rubber bag with the bag sealed thereto top and bottom, means for applying hydraulic pressure within said bag, said dies being floatingly mounted on said frame and thus free to axially approach one another for foreshortening of the blank as the blank is deformed outwardly in the region between said ridges, said post including means for shortening the same and thus reducing the length of the bag incident to the deformation of the blank.

3. In a drum making machine for forming annular beads in a cylindrical blank, the combination comprising a frame, a plurality of annular dies, a cylindrical rubber bag axially centered within said dies to define an annular space for said blank and having means for hydraulically inflating the same, and a head member having means for securing the same in an axially centered position above said bag following insertion of the blank into said annular space, said head member having a concave receiving surface for supporting the upper end of said bag against outward expansion incident to applying hydraulic pressure in said bag.

4. In a drum making machine for forming annular beads in a cylindrical blank, the combination comprising a frame, a plurality of annular dies vertically spaced in said frame, a cylindrical rubber bag having an internal supporting post and axially centered within said dies to define a workspace for said blank, means for hydraulically inflating said bag, and a head member having means for securing the same to the upper end of the post following insertion of the blank into said workspace, said head member having a concave receiving surface for supporting the upper end of said bag against outward expansion incident to applying hydraulic pressure within said bag.

5. In a drum making machine for forming annular beads in a cylindrical blank, the combination comprising a frame, a plurality of vertically spaced annular dies axially movable toward and away from one another in said frame, a cylindrical rubber bag axially centered within said dies to define an annular space for said blank, means for hydraulically inflating said bag, and a head member having means for securing the same to the uppermost one of said dies in an axially centered position above said bag following insertion of the blank into said annular space, said head member having a concave receiving surface for supporting the upper end of said bag against outward expansion incident to applying hydraulic pressure within said bag, and means for moving the head and associated die downwardly incident to the formation of beads between the dies.

6. In a drum making machine for forming annular beads in a cylindrical blank, the combination comprising a frame, a central post in said frame, said post having upper and lower portions arranged for limited telescoping movement, a fluid actuator in said post and interposed between upper and lower portions, a cylindrical rubber bag surrounding said post, means for sealing the upper end of said bag to the upper portion of the post, a plurality of segmented annular dies arranged axially side-by-side and centered with respect to said post to define an annular workspace for insertion of said cylindrical blank, means for applying hydraulic pressure in said bag sufficient to deform said blank outwardly into contact with said dies, and means for thereafter applying hydraulic pressure to said actuator to cause the post to telescope together simultaneously with application of increased pressure in said bag.

7. In a drum making machine for forming annular beads in a cylindrical blank, the combination comprising a frame, a plurality of segmented annular die elements arranged side-by-side therein, a cylindrical rubber bag centered with respect to said annular die elements and defining an annular workspace therebetween, a support at the lower end of said annular workspace for supporting the cylindrical blank therein, a head member for enclosing the upper end of said workspace following insertion of a blank, hydraulic means for inflating said bag for deformation of said blank against said die elements, means for retracting said die elements radially away from said blank to free the deformed blank for endwise removal, and means for connecting said work support to said head so that upon elevation of said head said work support causes the deformed blank to be upraised clear of said die elements.

8. In a drum making machine for forming annular beads in a cylindrical blank, the combination comprising a frame, a plurality of segmented annular die elements arranged side-by-side therein, a cylindrical rubber bag centered with respect to said annular die elements and defining an annular workspace therebetween, a support at the lower end of said annular workspace for supporting the cylindrical blank therein, a head member for enclosing the upper end of said workspace following insertion of a blank, hydraulic means for inflating said bag for deformation of said blank against said die elements, means for retracting said die elements radially away from said blank to free the deformed blank for endwise removal, and means for simultaneously elevating said head and said work support with the deformed blank seated on the latter until the deformed blank is upraised clear of said die elements so that the blank is accessible for lateral conveyance away from the machine.

9. In a drum making machine for forming annular beads in a cylindrical blank, the combination comprising a frame, a plurality of segmented annular die elements arranged side-by-side therein, a cylindrical rubber bag centered with respect to said annular die elements and defining an annular workspace therebetween, a work support at the lower end of said annular workspace for supporting the cylindrical blank therein, hydraulic means for inflating said bag for deformation of said blank against said die elements, said work support having supporting fingers mounted for retreating movement in the face of the inflating bag, means for retracting said die elements radially away from said blank to free the blank for endwise movement, means for deflating said bag, and means for elevating said work support with the deformed blank seated on the latter until the deformed blank is upraised clear of said die elements.

10. In a drum making machine for forming annular beads in a cylindrical blank, the combination comprising a frame, a plurality of annular dies arranged flatly side-by-side and axially spaced from one another in said frame, a cylindrical rubber bag centered within said dies and defining an annular workspace, means for supporting a cylindrical blank in said workspace, means for applying hydraulic pressure in said bag, spacing means including an elongated plate having a series of steps along one edge engaging the respective annular dies for spacing them apart a predetermined distance until said blank comes into contact with said dies, and means for thereafter removing said stepped plate from said dies so that the dies are free to move toward one another incident to the foreshortening of the blank as the bead portions of the blank are deformed radially outward.

11. In a drum making machine for forming annular beads in a cylindrical blank, the combination comprising a frame, a plurality of annular dies arranged flatly side-by-side and axially spaced from one another in said frame, a cylindrical rubber bag centered within said dies and defining an annular workspace, means for supporting a cylindrical blank in said workspace, means for applying hydraulic pressure in said bag, means including a set of elongated plates each having steps along one edge engaging the respective annular dies for temporarily spacing them apart a predetermined distance until said blank comes into contact with said dies and so that said dies are free to move toward one another incident to the foreshortening of the blank as the blank is deformed radially outward, said set of spacing plates being mounted for removal and replacement by a set having unlike spacing of the steps.

12. In a drum making machine for forming annular beads in a cylindrical blank, the combination comprising a frame, a plurality of segmented annular dies, a cylindrical rubber bag centered with respect to the dies and defining an annular workspace, means for supporting the blank in said workspace, a rigid cylindrical supporting mandrel within said bag, said bag being prestressed so that it tends to cling tightly to said supporting mandrel, and means for inflating said bag.

13. In a drum making machine for forming annular beads in a cylindrical blank, the combination comprising a frame, a plurality of segmented annular dies, a cylindrical rubber bag centered with respect to the dies and defining an annular workspace, means for supporting the blank in said workspace, a rigid cylindrical supporting mandrel within said bag, means for inflating said bag, said bag being prestressed so that when not inflated it tends to cling tightly to said supporting mandrel, said bag and supporting member being removable from the machine as a unit so that the bag may be stretched over the supporting mandrel outside of said machine.

14. In a drum making machine for forming annular beads in a cylindrical blank, the combination comprising a frame, a plurality of segmented annular dies, a cylindrical rubber bag centered with respect to the dies and defining an annular workspace, means for supporting the blank in said workspace, applying hydraulic pressure, a rigid cylindrical supporting mandrel within said bag, said bag being prestressed so that it tends to cling tightly to said supporting mandrel, said bag and supporting mandrel being removable from the machine as a unit so that the bag may be stretched over the supporting mandrel outside of said machine, said mandrel being made in two portions spaced end to end to permit shortening of the bag as it is inflated.

15. In a drum making machine for forming annular beads in a cylindrical blank, the combination comprising a frame, a plurality of segmented annular dies mounted in said frame and arranged axially side-by-side, a cylindrical rubber bag centered with respect to said dies, a central post for supporting said bag and sealed thereto at its upper and lower ends, said bag having a normal diameter which is substantially less than the diameter of the post, means for injecting hydraulic fluid between said post and said bag for expanding the bag outwardly for deforming of the blank by said dies, said rubber bag being prestressed by stretching the same over said post so that upon release of hydraulic pressure said bag tends to immediately deflate by squeezing the hydraulic fluid out of the space between the bag and the post.

16. In a drum making machine for forming annular beads in a cylindrical metal blank, the combination comprising a frame, a plurality of segmented annular dies in stacked relation and movable with respect to one another, a cylindrical rubber bag defining with the dies an annular workspace, means for supporting the cylindrical blank in said workspace, means for applying progressively increased hydraulic pressure within said bag to press the blank outwardly against said dies, means for initially spacing the dies with respect to one another, a head having a recess, the inner wall of said recess being tapered and having a maximum diameter which generally corresponds to the inner diameter of the dies for receiving and supporting the end portion of said bag incident to inflation thereof by the hydraulic pressure, and pressure responsive means operated incident to the achievement of a pressure in said bag which is sufficiently high as to indicate firm engagement between said dies and said blank for applying axially inward pressure to said head and to the adjacent edge portion of said blank thereby to cause outward collapsing movement of the metal forming said beads accompanied by a decrease in the spacing of the dies and a shortening of the blank to its final dimension.

17. In a drum making machine for forming annular beads in a cylindrical blank, the combination comprising a frame, a plurality of segmented annular dies in stacked relation and initially spaced from one another, a cylindrical rubber bag for pressing the blank outwardly against the dies, means for applying increasing pressure within said bag, said bag being extended upwardly beyond said dies, a head having a recess for receiving and supporting the portion of the bag which extends above the level of said dies, the topmost one of said dies having a shoulder bounded by an adjacent annular recess so that application of relatively low pressure in said bag causes formation of a flange about said shoulder, and means operated incident to the achieving of a high pressure in said bag for causing movement of the dies toward one another thereby to induce outward collapsing movement of the metal between said dies.

18. In a drum making machine for forming annular beads in a cylindrical blank, the combination comprising a frame, a plurality of segmented annular dies in stacked relation and initially spaced from one another, a cylindrical rubber bag for pressing the blank outwardly against the dies, means for progressively inflating the bag, said bag being extended upwardly beyond said dies and having a central supporting post, a head secured to the upper end of the post and having a recess for receiving and supporting the portion of the bag which extends above the level of said dies, the topmost one of said dies having an abutment and an adjacent annular recess so that application of relatively low pressure in said bag causes formation of a flange on said blank, and means responsive to the achieving of a predetermined pressure in said bag for causing downward movement of said head thereby to induce collapsing movement of the metal forming the beads in said blank.

19. In a drum making machine for forming annular beads in a cylindrical blank, the combination comprising a frame, a set of annular bead-forming dies, a bag centered with respect to said dies for pressing the metal blank outwardly against the dies, means for closing the segmented dies for resisting radially applied pressure, means for raising said dies so that they occupy predetermined initially spaced positions relative to one another, means for applying a relatively limited fluid pressure in said bag for initiating inflation of the same, means for applying a high pressure in said bag for completing the inflation, and interlock means actuated by reason of the closing of said dies and by achieving of the predetermined spaced relationship between them for initiating operation of said high pressure applying means to deform said blank into said dies.

20. In a drum making machine for forming annular beads in a cylindrical blank, the combination comprising a frame, a plurality of segmented annular dies arranged one above the other, a cylindrical rubber bag centered with respect to said dies for defining an annular workspace, means for supporting a blank in said workspace, means for simultaneously moving the die segments from a laterally spread open position to a locked working position, a movable head for supporting the upper end of said bag, said dies being movable between a lowered position in which they are bottomed on one another and a raised position in which they are spaced from one another, means for causing the head to be coupled to the uppermost die when the dies are in lowered position, interlock means responsive to locking of the segments for causing movement of the head and dies to their upraised positions, and means responsive to said head reaching its raised position for applying hydraulic pressure within said bag so that the blank is forced outwardly against said spaced dies.

21. In a drum making machine for forming annular beads in a cylindrical metal blank, the combination comprising a frame, a plurality of segmented annular dies, a cylindrical rubber bag defining an annular workspace, means for supporting the cylindrical blank in such workspace, a head for supporting and confining the upper end of the bag, said head being movable between raised and lowered positions, means for supporting the dies one upon the other when the head is in its lowered position, and spacer means coupled to said head for progressively picking up said dies as the head moves from its lowered position to its raised position and for spacing the dies relative to one another, means for applying hydraulic pressure within said bag for expanding said blank outwardly and into contact with the dies, and means for subsequently forcibly lowering the head while increasing the pressure in said bag so that the metal forming the beads collapses outwardly accompanied by axial shortening of said blank.

22. In a drum making machine for forming annular beads in a cylindrical blank, the combination comprising a frame, a plurality of segmented annular dies in stacked relation in said frame, a cylindrical rubber bag centered within said frame for pressing the blank outwardly against the dies, an annular blank supporting member having a diameter which corresponds substantially to the diameter of the blank, means for laterally transporting the blank into centered position with respect to the dies with the blank supported on said annular supporting member, and means for lowering said annular supporting member and said blank into working position.

23. In a drum making machine for forming annular beads in a cylindrical blank, the combination comprising a frame, a plurality of segmented annular dies in stacked relation in said frame, a cylindrical rubber bag centered within said frame for pressing the blank outwardly against the dies, a blank supporting member movable between a raised blank receiving position and a lowered working position, a head for enclosing and supporting the upper end of said bag movable between a raised blank-receiving position and a lowered working position, and means for moving the blank-supporting member and head in unison with one another.

24. In a drum making machine for forming annular beads in a cylindrical blank, the combination comprising a frame, a plurality of segmented annular dies in stacked relation in said frame, a cylindrical rubber bag for pressing the blank outwardly against the dies, means for laterally advancing the blank into a centered position above the dies, means for lowering the blank between the bag and the dies with the die segments spread apart, means for inflating the bag and closing the die segments incident to lowering the bag into working position, means for spacing the dies axially with respect to one another, means actuated in response to achieving a predetermined bag pressure for forcibly bottoming the dies on one another thereby to form a completed workpiece, means responsive to bottoming of the dies for deflating the bag, means operated incident to reaching a predetermined low pressure for opening the die segments simultaneously to free the workpiece, and means responsive to the opening of the segments for raising the workpiece into position for lateral transport from the machine.

25. In a drum making machine for forming annular beads in a cylindrical blank, the combination comprising a frame, a plurality of segmented annular dies in stacked relation in said frame, a cylindrical rubber bag for pressing the blank outwardly against the dies, means for laterally advancing the blank into a centered position above the dies, means actuated by arrival of the blank in said centered position for lowering the blank between the bag and the dies with the die segments spread apart, means for inflating the bag and closing the die segments, means for spacing the dies axially with respect to one another, means actuated incident to the making of contact between the blank and the dies for forcibly bottoming the dies on one another, means responsive to bottoming of the dies for causing emptying of the bag, and means for opening the die segments simultaneously to free the completed workpiece for removal from the machine.

26. In a drum making machine for forming annular beads in a cylindrical blank, the combination comprising the frame, a plurality of segmented annular dies in stacked relation in said frame, a cylindrical rubber bag for pressing the blank outwardly against the dies, means for lowering the blank between the bag and the dies with the die segments spread apart, means for initiating inflation of the bag and closing of the die segments prior to the time that the blank is fully lowered into working position, means for spacing the dies axially with respect to one another, means actuated in response to achieving a predetermined bag pressure for forcibly bottoming the dies on one another thereby to form a completed workpiece, means responsive to bottoming of the dies for deflating the bag, means for initiating opening of the die segments and raising of the workpiece prior to complete deflation of the bag.

27. In a drum making machine for forming annular beads in a cylindrical blank, the combination comprising a frame, a plurality of segmented annular dies in stacked relation, a cylindrical rubber bag for pressing the blank outwardly against the dies, reciprocating means for advancing a blank into a centered position above the dies, means actuated upon arrival of the blank in said position for lowering the blank between the bag and the dies with the die segments spread apart, means operated incident to lowering of the blank into working position for inflating the bag and closing the die segments, means for spacing the dies axially with respect to one another, means actuated in response to achieving a predetermined bag pressure for forcibly bottoming the dies with respect to one another for formation of a completed workpiece, means responsive to bottoming of the dies for deflating the bag, means operated incident to at least partial deflation of the bag for opening the die segments to free the workpiece, and means responsive to the opening of the segments for elevating the workpiece for lateral transport from the machine.

References Cited in the file of this patent

UNITED STATES PATENTS

| | | |
|---|---|---|
| 605,195 | Birtwisle | June 7, 1898 |
| 1,271,455 | Fitts | July 2, 1918 |
| 2,183,304 | Davis | Dec. 12, 1939 |
| 2,217,799 | Giesler | Oct. 15, 1940 |
| 2,541,869 | Grant | Feb. 13, 1951 |
| 2,610,667 | Puster | Sept. 16, 1952 |
| 2,773,538 | De Mers | Dec. 11, 1956 |
| 2,796,109 | Wood | June 18, 1957 |
| 2,963,068 | Chiappe | Dec. 6, 1960 |

FOREIGN PATENTS

| | | |
|---|---|---|
| 532,335 | Canada | Oct. 30, 1956 |
| 772,134 | Great Britain | Apr. 10, 1957 |